US009438109B2

United States Patent
Moon et al.

(10) Patent No.: US 9,438,109 B2
(45) Date of Patent: Sep. 6, 2016

(54) BI-DIRECTIONAL VOLTAGE POSITIONING CIRCUIT, VOLTAGE CONVERTER AND POWER SUPPLY DEVICE INCLUDING THE SAME

(71) Applicant: SAMSUNG ELECTRONICS CO., LTD., Suwon-si (KR)

(72) Inventors: Sung-Woo Moon, Seongnam-si (KR); Myeong-Lyong Ko, Seoul (KR); Yu-Seok Ko, Yongin-si (KR); Dong-Jin Keum, Suwon-si (KR); Hyun-Wook Yoo, Busan (KR); Hwa-Yeal Yu, Bucheon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 237 days.

(21) Appl. No.: 14/187,442

(22) Filed: Feb. 24, 2014

(65) Prior Publication Data

US 2014/0253073 A1 Sep. 11, 2014

(30) Foreign Application Priority Data

Mar. 5, 2013 (KR) ........................ 10-2013-0023121

(51) Int. Cl.
*H02M 3/156* (2006.01)
*H02M 3/158* (2006.01)
(Continued)

(52) U.S. Cl.
CPC .............. *H02M 3/156* (2013.01); *G05F 1/468* (2013.01); *H02M 1/44* (2013.01); *H02M 3/158* (2013.01); *H02M 3/1588* (2013.01);
(Continued)

(58) Field of Classification Search
CPC ............ H02M 2001/0009; H02M 2001/0025; H02M 3/158; H02M 3/156; H02M 3/1588
See application file for complete search history.

(56) References Cited

U.S. PATENT DOCUMENTS 6,297,617 B1 * 10/2001 Aoyama ................. H02J 7/022
320/127
7,268,527 B2 9/2007 Horner
(Continued)

FOREIGN PATENT DOCUMENTS

CN 101064474 A 10/2007
CN 101207335 A 6/2008
(Continued)

OTHER PUBLICATIONS

Communication dated Jun. 2, 2016, issued by the State Intellectual Property Office of the People's Republic of China in counterpart Chinese Application No. 201410078841.4.

*Primary Examiner* — Timothy J Dole
*Assistant Examiner* — Ishrat Jamali
(74) *Attorney, Agent, or Firm* — Sughrue Mion, PLLC

(57) ABSTRACT

A bi-directional voltage positioning circuit includes a voltage to current converter, a current mirror circuit and a switch. The voltage to current converter converts a sensing voltage to a first current, and the sensing voltage is sensed based on a current flowing through an output coil connected between a switching node and an output node. The current mirror circuit mirrors the first current to generate a second current and a third current, the second current is N times greater than the first current, the third current is M times greater than the first current, and N and M are real numbers greater than zero. The switch provides a feedback node with one of the second current and third current in response to a switching control signal, and an output voltage of the output node is divided at the feedback node.

22 Claims, 17 Drawing Sheets

(51) Int. Cl.
  *G05F 1/46*     (2006.01)
  *H02M 1/44*     (2007.01)
  *H02M 1/00*     (2006.01)

(52) U.S. Cl.
  CPC ............... *H02M 2001/0009* (2013.01); *H02M 2001/0025* (2013.01); *Y02B 70/1466* (2013.01)

(56) References Cited

U.S. PATENT DOCUMENTS

| | | |
|---|---|---|
| 7,294,993 B2 | 11/2007 | Clavette et al. |
| 7,560,917 B2 | 7/2009 | Ho et al. |
| 7,626,372 B2 | 12/2009 | Yang |
| 7,679,350 B2 | 3/2010 | Falvey et al. |
| 7,800,927 B2 | 9/2010 | Yang |
| 8,120,346 B2 | 2/2012 | Ostrom et al. |
| 8,143,870 B2 | 3/2012 | Ng et al. |
| 8,159,205 B1 | 4/2012 | Latham, II et al. |
| 8,179,700 B2 | 5/2012 | Yang |
| 2004/0240238 A1 | 12/2004 | Jauregui et al. |
| 2009/0058323 A1 | 3/2009 | Yang |
| 2009/0146643 A1* | 6/2009 | Ostrom ............... H02M 3/156 324/123 R |
| 2010/0072970 A1 | 3/2010 | Ouyang |
| 2010/0301822 A1* | 12/2010 | Chen ............... H02M 3/156 323/283 |

FOREIGN PATENT DOCUMENTS

| | | |
|---|---|---|
| CN | 101252800 A | 8/2008 |
| CN | 101291107 A | 10/2008 |
| CN | 201229513 Y | 4/2009 |
| CN | 202362691 U | 8/2012 |
| CN | 202711104 U | 1/2013 |
| JP | 2001-078436 A | 3/2001 |
| JP | 2005-312141 A | 11/2005 |

\* cited by examiner

# BI-DIRECTIONAL VOLTAGE POSITIONING CIRCUIT, VOLTAGE CONVERTER AND POWER SUPPLY DEVICE INCLUDING THE SAME

CROSS-REFERENCE TO RELATED APPLICATION

This application claims priority from Korean Patent Application No. 10-2013-0023121, filed on Mar. 5, 2013, in the Korean Intellectual Property Office, the disclosure of which are herein incorporated by reference in its entirety.

BACKGROUND

1. Field

Apparatuses and methods consistent with exemplary embodiments relate generally to power supply devices, and more particularly, to a bi-directional voltage positioning circuit, a voltage converter, and a power supply device including the same.

2. Description of the Related Art

Generally, power supply devices are needed to supply voltage for operation of electronic devices. One type of power supply devices is a voltage converter, one example of which is a direct current-direct current (DC-DC) converter. DC-DC converters are used in many types of electronic devices to provide a stable power supply voltage. Pulse width modulation (PWM) has become a widely-used technique for controlling the DC-DC converters by adjusting a current through an inductor thereof.

SUMMARY

Exemplary embodiments may address at least the above problems and/or disadvantages and other disadvantages not described above. Also, the exemplary embodiments are not required to overcome the disadvantages described above, and an exemplary embodiment may not overcome any of the problems described above.

One or more exemplary embodiments provide a bi-directional voltage positioning circuit (BVPC), capable of enhancing performance and reducing noises of a voltage converter.

One or more exemplary embodiments provide a voltage converter including the BVPC.

One or more exemplary embodiments provide a power supply device including the voltage converter.

According to an aspect of an exemplary embodiment, a BVPC includes a voltage to current converter, a current mirror circuit and a switch. The voltage to current converter converts a sensing voltage to a first current, and the sensing voltage is sensed based on a current flowing through an output coil connected between a switching node and an output node. The current mirror circuit mirrors the first current to generate a second current and a third current, the second current is N times greater than the first current, the third current is M times greater than the first current, and N and M are real numbers greater than zero. The switch provides a feedback node with one of the second current and third current in response to a switching control signal, and an output voltage of the output node is divided at the feedback node.

In an embodiment, the output coil may include an inductance of the output coil and a direct-current (DC) resistor connected to the inductance in series.

In an embodiment, the voltage to current converter may include an operational amplifier connected to the output coil in parallel, which has a first input terminal connected to a first input node between a sensing resistor and a sensing capacitor connected in series with respect to each other between the switching node and the output node, an n-channel metal-oxide semiconductor (NMOS) transistor that has a drain connected to the current mirror circuit, a source connected to a second input terminal of the operational amplifier and a gate connected to an output terminal of the operational amplifier, and droop resistor connected between the source of the NMOS transistor and the output node.

The first current corresponds to a value that the sensing voltage is divided by a resistance of the droop resistor.

In an embodiment, the current mirror circuit may include a first PMOS transistor connected between a power supply voltage and the voltage to current converter, a second PMOS transistor connected between the power supply voltage and the switch, the second PMOS transistor constituting a first current mirror with the first PMOS transistor, a third PMOS transistor connected to the power supply voltage, the third PMOS transistor constituting a second current mirror with the first PMOS transistor, a first NMOS transistor connected between the third PMOS transistor and a ground voltage and a second NMOS transistor connected between the switch and the ground voltage. The second NMOS transistor may constitute a third current mirror with the first NMOS transistor.

A size of the second PMOS transistor may be N times greater than a size the first PMOS transistor, a size of the third PMOS transistor may be M times greater than the size the first PMOS transistor, and the first and second NMOS transistor may have same sizes with respect to each other.

The second current may be provided to the switch at a drain of the second PMOS transistor and the third current may be provided to the switch at a drain of the second NMOS transistor.

The current mirror circuit may further include a filter unit that filters a switching noise, and the filter unit may be connected between the first and second PMOS transistors.

In an embodiment, one of the second current and the third current may be selectively provided to the feedback node according to a characteristic of a load connected to the output node.

The output voltage may be divided by first and second resistors connected in series between the output node and a ground voltage, the first and second resistors may be connected to each other at the feedback node, and one of the second current and the third current may be selectively provided to the feedback node.

The second current may be provided to the feedback node when a level of the output voltage is to be decreased as a load current flowing into the load increases.

The third current may be provided to the feedback node when a level of the output voltage is to be increased as a load current flowing into the load increases.

According to an aspect of another exemplary embodiment, a voltage converter includes a current sensor, a BVPC, a switching control circuit and a switching device unit. The current sensor senses a current flowing through an output coil connected between a switching node and an output node to provide a sensing voltage based on the sensed current. The BVPC generate a second current and a third current to provide a feedback node with one of the second current and third current according to a characteristic of a load connected to the output node, an output voltage of the output node is divided at the feedback node, the first and second currents are real number multiple of a first current, and the first current is converted based on the sensing voltage. The switching control circuit generates first and second driving control signals based on a feedback voltage and a reference voltage, and the feedback voltage is obtained by dividing the output voltage. The switching device unit charges an input power supply voltage in the output coil or discharges the output coil in response to the first and second driving control signals. The BVPC includes a voltage to current converter, a current mirror circuit and a switch. The voltage to current converter converts the sensing voltage to the first current. The current mirror circuit mirrors the first current to generate the second current and the third current, the second current is N times greater than the first current, the third current is M times greater than the first current, and N and M are real numbers greater than zero. The switch provides the feedback node with one of the second current and third current in response to a switching control signal.

In an embodiment, the switching control circuit may include a comparator that compares the reference voltage and the feedback voltage to output an error voltage, an oscillator that generates a clock pulse, a flip-flop that provides an output signal based on the error voltage and the clock pulse, and a driving control unit that determines on and off timings of at least one of the first and second driving control signals according to the output signal of the flip-flop.

The flip-flop may include a RS flip-flop that has a set terminal receiving the clock pulse and a reset terminal receiving the error voltage.

In an embodiment, the switching control circuit may include a comparator that compares the reference voltage and the feedback voltage to output an error voltage, an oscillator that generates a triangular wave signal, a pulse width modulation comparator that compares the error voltage and the triangular wave signal to output a pulse signal, and a driving control unit that determines on and off timings of at least one of the first and second driving control signals according to the pulse signal.

In an embodiment, the switching device may include a first switching device that charges the input power supply voltage in the output coil in response to the first driving control signal, and a second switching device that discharges the output coil in response to the second driving control signal.

The first and second switching devices may be turned on or off complementarily to each other.

The first switching device may include a PMOS transistor that has a source configured to receive the input power supply voltage, a gate configured to receive the first driving control signal and a drain connected to the switching node, and the second switching device may include an NMOS transistor that has a drain connected to the switching node, a gate configured to receive the second driving control signal and a source connected to a ground voltage.

In an embodiment, the voltage converter may further include a feedback unit that includes first and second resistors connected in series between the output node and a ground voltage, and the feedback unit may divide the output voltage into the feedback voltage.

The BVPC may selectively provide one of the second current and the third current to the feedback node according to a characteristic of a load connected to the output node, and the first and second resistors are connected to each other at the feedback node.

According to an aspect of still another exemplary embodiment, a power supply device includes a voltage converter and a load. The voltage converter generates a second current and a third current to provide a feedback node with one of the second current and third current according to a load connected to the output node, and charges an input power supply voltage in the output coil or to discharge the output coil in response to first and second driving control signals that respectively have on and off timings based on difference between a feedback voltage of the feedback node and a reference voltage, an output voltage of the output node is divided at the feedback node, the first and second currents are real number multiple of a first current, and the first current is converted based on a sensing voltage. The load is connected to the output node, and one of the second and third currents is provided to the feedback node according to a characteristic of the load.

In an embodiment, when the load is a low drop-out (LDO) regulator, the third current may be provided to the feedback node and the voltage converter may increase a level of the output voltage in response to an increase of a load current flowing into the LDO regulator.

According to an aspect of still another exemplary embodiment, a power supply device includes a sub-regulator and a low drop-out (LDO) regulator. The sub-regulator converts an input power supply voltage to a first output voltage. The LDO regulator receives the first output voltage at an input terminal thereof, converts the first output voltage to a second output voltage having a regular level and outputs the second output voltage at an output node. The sub-regulator increases a level of the first output voltage as an output current flowing into the LDO regulator increases.

According to an aspect of still another exemplary embodiment, a voltage positioning system for use in a regulator having an input coupled to a switching device and an output coupled to a load includes a current sensor and a bi-directional voltage positioning circuit (BVPC). The current sensor is coupled between the switching device and the output and senses an output current of the regulator and generate a first voltage based on the sensed output current. The BVPC provides different levels of a feedback voltage at a feedback node based on the first voltage and a characteristic of the load, an output voltage of the output node being divided at the feedback node.

According to an aspect of still another exemplary embodiment, a voltage regulator having differing voltage positioning modes, the voltage regulator includes a sub-regulator stage configured to receive information corresponding to a voltage positioning mode of the voltage regulator and configured to convert an input power supply voltage to a first voltage corresponding to the voltage positioning mode and a voltage supply regulator stage configured to output a second voltage based on the first voltage. A level of the first voltage is increased according to an increase of an output current of the voltage regulator in a first voltage positioning mode and the level of the first voltage is decreased according to the increase of the output current of the voltage regulator in a second voltage positioning mode.

BRIEF DESCRIPTION OF THE DRAWINGS

The above and/or other aspects will become apparent by describing certain exemplary embodiments with reference to the attached drawings in which.

DETAILED DESCRIPTION

Figure 1:
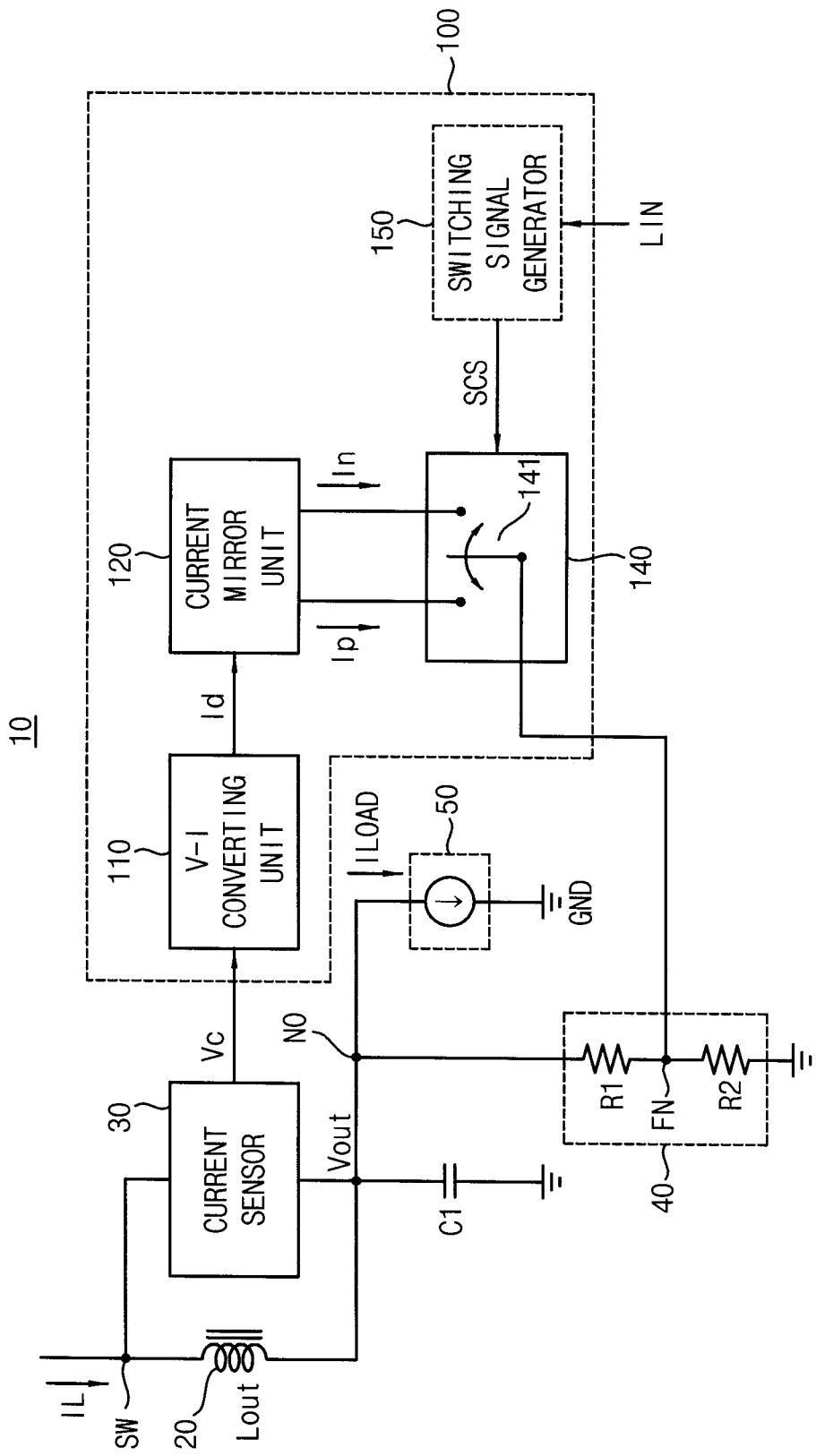
FIG. 1 is a block diagram illustrating an output circuit of a voltage converter including a bi-directional voltage positioning circuit (BVPC) according to an exemplary embodiment.

Various exemplary embodiments will be described more fully with reference to the accompanying drawings, in which exemplary embodiments are shown. The disclosure may, however, be embodied in many different forms and should not be construed as limited to the exemplary embodiments set forth herein. Rather, these exemplary embodiments are provided so that this disclosure will be thorough and complete, and will fully convey the scope of the disclosure to those skilled in the art Like reference numerals refer to like elements throughout this application.

It will be understood that, although the terms first, second, etc. may be used herein to describe various elements, these elements should not be limited by these terms. These terms are used to distinguish one element from another. For example, a first element could be termed a second element, and, similarly, a second element could be termed a first element, without departing from the scope of the inventive concept. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments and is not intended to be limiting of the inventive concept. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, according to exemplary embodiments will be described in detail with reference to accompanying drawings.

FIG. 1 is a block diagram illustrating an output circuit of a voltage converter including a bi-directional voltage positioning circuit (BVPC) according to an exemplary embodiment.

Referring to FIG. 1, an output circuit 10 of a voltage converter includes a current sensor 30 connected in parallel to an output coil Lout 20, a feedback unit 40 and a BVPC 100. A load 50 is illustrated for illustrative convenience in FIG. 1, however, the output circuit 10 may not include the load 50.

The current sensor 30 is connected between a switching node SW and an output node NO in parallel with the output coil 20. A capacitor C1, the feedback unit 40 and the load 50 may be connected in parallel between the output node NO and a ground voltage GND. The feedback unit 40 include first and second resistors R1 and R2 connected in series between the output node NO and the ground voltage GND, the first and second resistors R1 and R2 are connected to each other at a feedback node FN, and an output voltage Vout is divided by a ratio of the first and second resistors R1 and R2 at the feedback node FN.

The BVPC 100 includes a voltage to current converting unit 110, e.g., a current converter, a current mirror unit 120, e.g., a current mirror circuit, and a switching unit 140. The BVPC 100 may further include a switching signal generator 150. The voltage to current converting unit 110 converts a sensing voltage Vc sensed in the current sensor 30 to a first current Id. The current mirror unit 120 mirrors the first current Id to generate a second current Ip and a third current In. The second current Ip may be real number multiple of the first current Id, and the third current In may be real number multiple of the first current Id. The switching unit 140, by using a switch 141, may selectively provide one of the second and third currents Ip and In in response to a switching control signal according to a kind (or characteristic) of the load 50. The switching signal generator 150 may provide the switching unit 140 with the switching control signal based on load information LIN indicating the kind (or characteristic) of the load 50. The current sensor 30 senses a current IL flowing through the output coil 20 to provide the sensing voltage Vc based on the sensed current IL.

Figure 2:
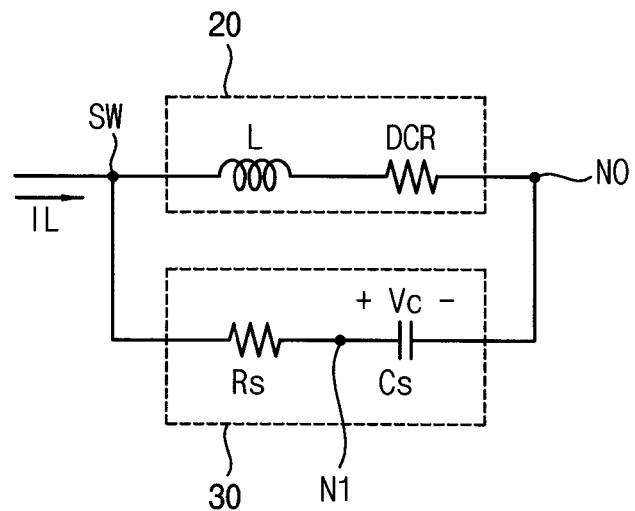
FIG. 2 illustrates examples of an output coil and a current sensor in the output circuit in FIG. 1.

FIG. 2 illustrates examples of the output coil and the current sensor in the output circuit in FIG. 1.

Referring to FIG. 2, the output coil 20 may include an inductance L and a direct current (DC) resistor DCR connected in series between the switching node SW and the output node NO. In practice, all inductors include a winding that is a wire such as, for example, copper that surrounds a magnetic material or air. This wire has a resistance per unit length that leads to a distributed resistance that can be measured as the DC resistance of the inductor. A fairly good model of the practical inductor lumps the distributed winding resistance into a single element DCR that is in series with an ideal inductance.

The current sensor 30 may include a sensing resistor Rs and a sensing capacitor Cs connected in series between the switching node SW and the output node NO. The sensing resistor Rs and the sensing capacitor Cs are connected to each other at a first node N1. The inductor current IL flowing through the output coil 20 does not flow into the current sensor 30. Therefore, the sensing voltage Vc across two ends of the sensing capacitor Cs may be formulated in an s-domain as the following equation 1.

$$Vc = (sL + DCR)i_L \frac{\frac{1}{sC}}{R_s + \frac{1}{sC}} = i_L \cdot DCR \frac{\left(1 + \frac{sL}{DCR}\right)}{1 + sCR_s}$$ [Equation 1]

When poles and zeros match in the equation 1, that is, when $$\frac{sL}{DCR} = CR_s$$

the sensing voltage Vc may be formulated as the following equation 2.

$$Vc = I_L DCR$$ [Equation 2]

The sensing voltage Vc becomes a voltage between two ends of the DC resistor DCR of the output coil 20. Therefore, the inductor current IL of the output coil 20 may be accurately measured.

Figure 3:
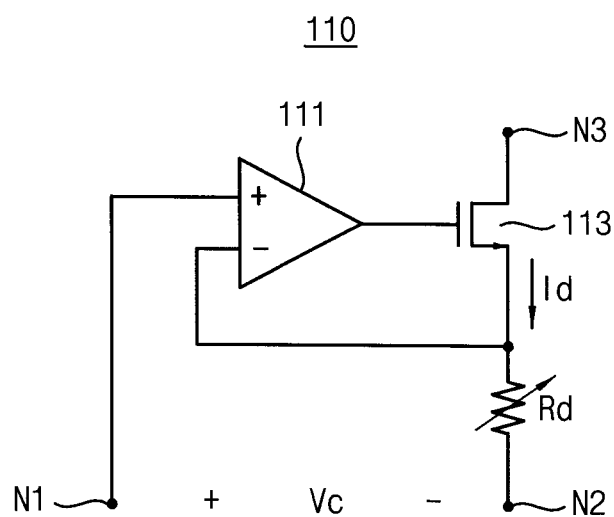
FIG. 3 is a circuit diagram illustrating an example of a voltage to current converting unit in FIG. 1 according to an exemplary embodiment.

FIG. 3 is a circuit diagram illustrating an example of the voltage to current converting unit in FIG. 1 according to an exemplary embodiment.

Referring to FIG. 3, the voltage to current converting unit 110 includes an operational amplifier 111, an n-channel metal-oxide semiconductor (NMOS) transistor 113 and a droop resistor Rd. The operational amplifier 111 has a first (or positive) input terminal connected to the first node N1, a second (or negative) input terminal connected to the droop resistor RD at a source of NMOS transistor 113 and an output terminal connected to a gate of the NMOS transistor 113. The NMOS transistor 113 has a drain connected to a third node N3, and the droop resistor Rd is connected between the source of the NMOS transistor 113 and a second node N2. Considering virtual short circuit of the operational amplifier 111, the sensing voltage Vc may be converted to a first current Id 0 by the droop resistor Rd as the following equation 2.

$$Id = Vc/Rd$$ [Equation 3]

Figure 4:
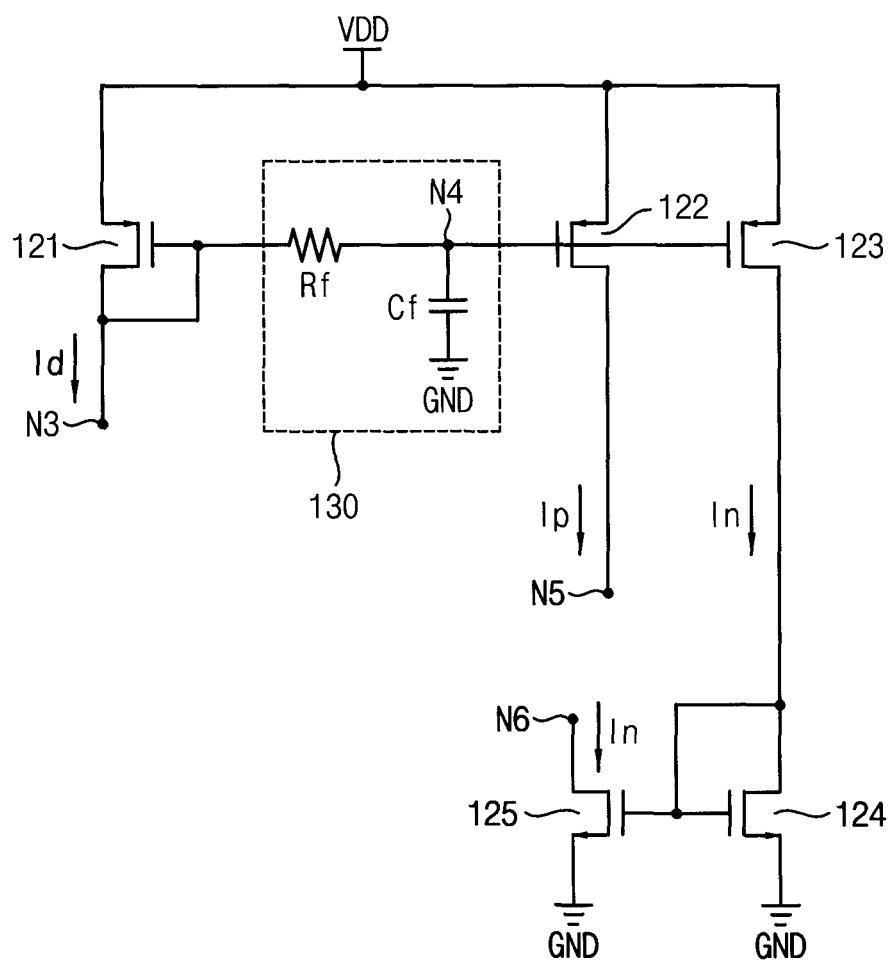
FIG. 4 is a circuit diagram illustrating an example of a current mirror unit in FIG. 1 according to an exemplary embodiment.

FIG. 4 is a circuit diagram illustrating an example of a current mirror unit in FIG. 1 according to an exemplary embodiment.

Referring to FIG. 4, the current mirror unit 120 includes a first through a third p-channel metal-oxide semiconductor (PMOS) transistors 121, 122 and 123, first and second NMOS transistors 124 and 125 and a filter unit 130.

The first PMOS transistor 121 is connected between a power supply voltage VDD and the third node N3 shown in FIG. 3. The first PMOS transistor 121 has a source connected to the power supply voltage VDD, a drain connected to the third node N3 and a gate connected to the filter unit 130 and the drain. The second PMOS transistor 122 is connected between the power supply voltage VDD and a fifth node N5. The second PMOS transistor 122 has a source connected to the power supply voltage VDD, a drain connected to the fifth node N5 and a gate connected to the filter unit 130. The second PMOS transistor 122 constitutes a first current mirror with the first PMOS transistor 121, and a size of the second PMOS transistor 122 is N times greater than a size of the first PMOS transistor 121, where N is a real number greater than zero. Therefore, the second current Ip N times greater than the first current Id may be provided at the drain of the second PMOS transistor 122.

The third PMOS transistor 123 is connected between the power supply voltage VDD and the first NMOS transistor 124. The third PMOS transistor 123 has a source connected to the power supply voltage VDD, a drain connected to the first NMOS transistor 124 and a gate connected to the filter unit 130. The third PMOS transistor 123 constitutes a second current mirror with the first PMOS transistor 121, and a size of the third PMOS transistor 123 is M times greater than a size the first PMOS transistor 121, where M is a real number greater than zero. Therefore, the third current In M times greater than the first current Id may be provided at the drain of the third PMOS transistor 123.

The first NMOS transistor 124 is connected between the third PMOS transistor 123 and the ground voltage GND. The first NMOS transistor 124 has a drain connected to the third PMOS transistor 123, a source connected to the ground voltage GND and a gate connected to the drain. The second NMOS transistor 125 is connected between a sixth node N6 and the ground voltage GND. The second NMOS transistor 125 has a drain connected to the sixth node N6, a source connected to the ground voltage GND and a gate connected to the drain. The second NMOS transistor 125 constitutes a third current mirror along with the first NMOS transistor 124. The second NMOS transistor 125 has substantially the same size as the first NMOS transistor 124, and the third current In may be provided at the drain of the second NMOS transistor 125.

The filter unit 130 is connected between the first and second PMOS transistors 121 and 122. The filter unit 130 includes a resistor Rf and a capacitor Cf, the resistor Rf is connected between the gate of the first PMOS transistor 121 and a fourth node N4, and the capacitor Cf is connected between the fourth node N4 and the ground voltage GND. Therefore, the filter unit 130 may low-pass filter a gate voltage of the first PMOS transistor 121.

Figure 5:
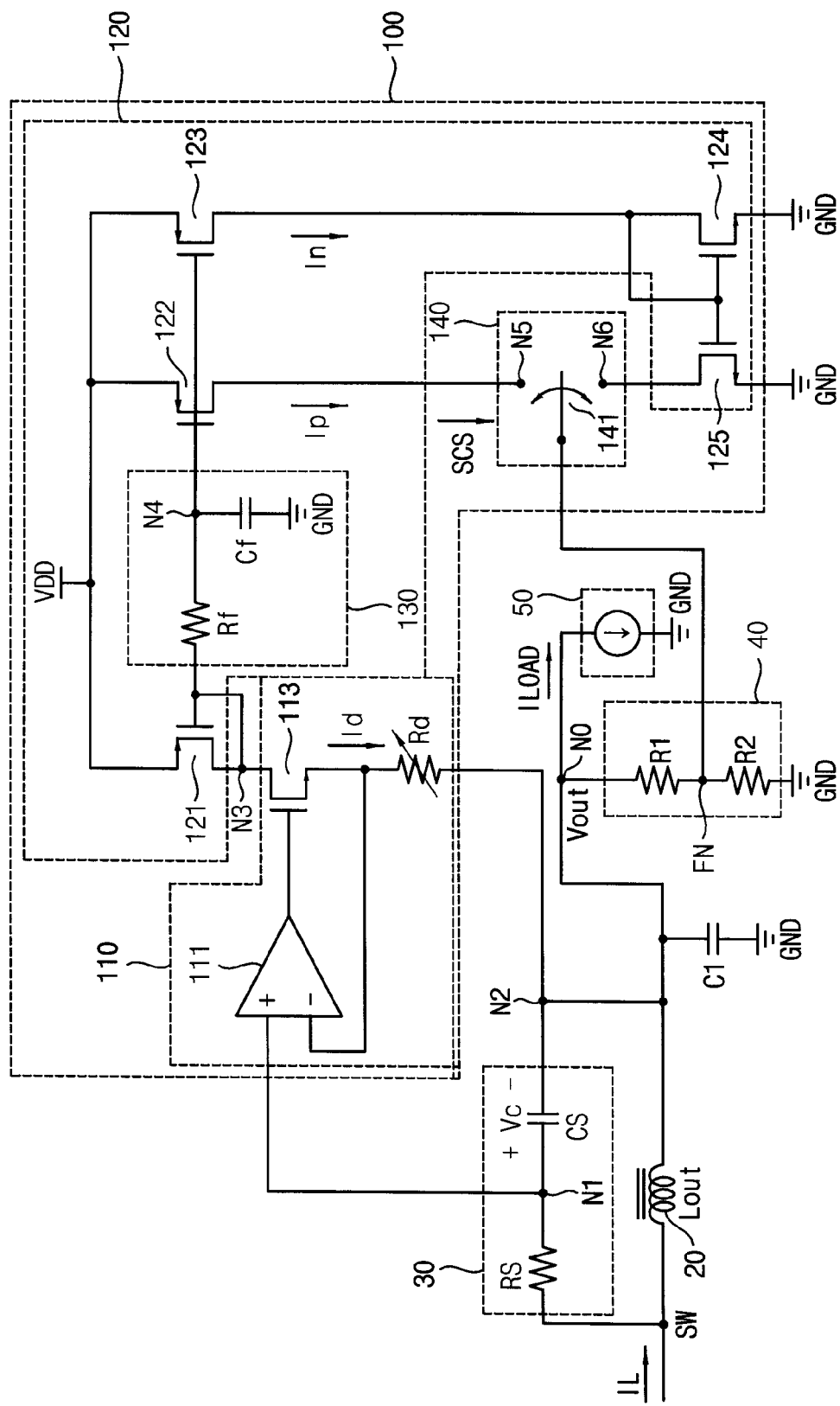
FIG. 5 is a circuit diagram illustrating the output circuit of the voltage converter including BVPC of FIG. 1.

FIG. 5 is a circuit diagram illustrating the output circuit of the voltage converter including BVPC of FIG. 1.

Hereinafter, operations of the output circuit 10 will be described with reference to FIGS. 1 through 5.

As described with reference to FIGS. 2 through 4, the sensing voltage Vc is converted to the first current Id as formulated by the equation 3. In addition, since the size of the second PMOS transistor 122 is N times greater than the size the first PMOS transistor 121 and the size of the third PMOS transistor 123 is M times greater than the size the first PMOS transistor 121, Ip=N*Id and In =M*Id. Therefore, when the switch 141 is connected to the fifth node N5 according to a characteristic of the load 50 connected to the output node NO, the second current Ip causes voltage drop in the second resistor R2, and a resultant output voltage Vout_p may be formulated by the following equation 4.

$$V_{out\_P} = V_{out} - \frac{i_L \cdot DCR \cdot N}{R_d} \cdot R2 \qquad \text{[Equation 4]}$$

As noted by the equation 4, when the switch 141 is connected to the fifth node N5, the level of the output voltage Vout may be decreased as load current ILOAD increases.

In addition, when the switch 141 is connected to the sixth node N6 according to the characteristic of the load 50 connected to the output node NO, the third current In causes voltage drop in the first resistor R1, and a resultant output voltage Vout_n may be formulated by the following equation 5.

$$V_{out\_N} = V_{out} + \frac{i_L \cdot DCR \cdot M}{R_d} \cdot R1 \qquad \text{[Equation 5]}$$

As noted by the equation 5, when the switch 141 is connected to the sixth node N6, the level of the output voltage Vout may be increased as the load current ILOAD increases.

Therefore, desired voltage drop or desired voltage rise with respect to the output voltage Vout may be obtained by adjusting a ratio of N and M with respect to the first current Id and a ratio of R1 and R2.

Figure 6A:
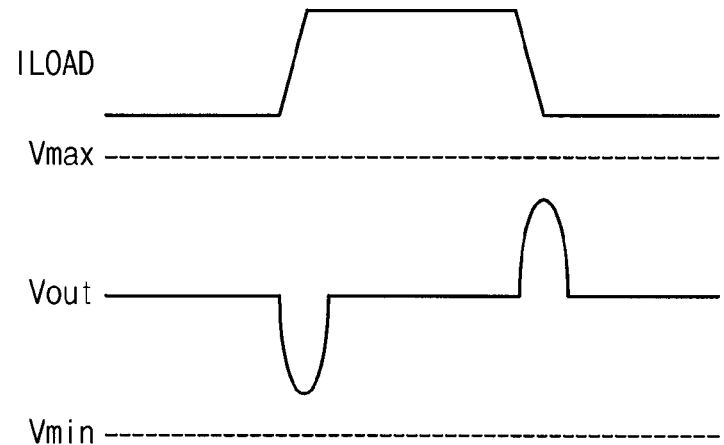
FIG. 6A is a waveform illustrating a related art voltage positioning scheme.

FIG. 6A is a waveform illustrating a related art voltage positioning scheme.

Figure 6B:
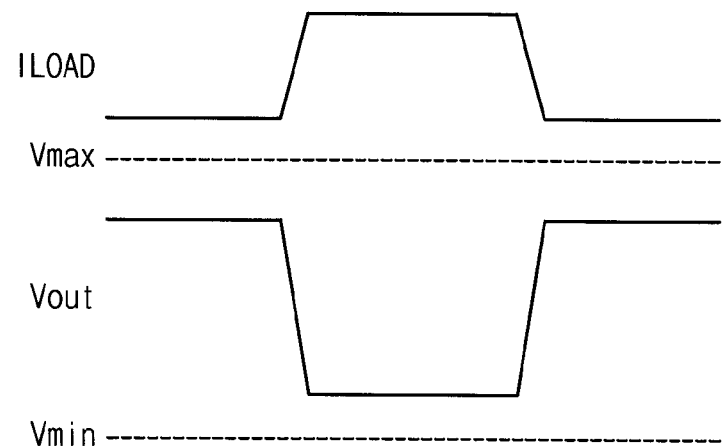
FIGS. 6B and 6C are waveforms illustrating a voltage positioning scheme according to exemplary embodiments.
Figure 6C:
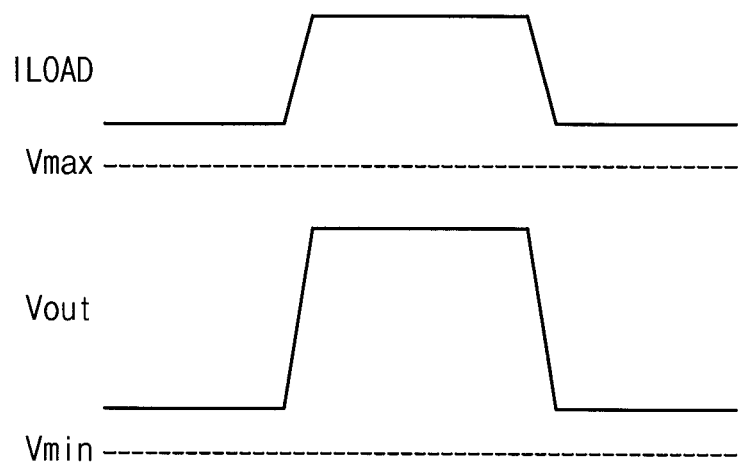

FIGS. 6B and 6C are waveforms illustrating voltage positioning scheme according to exemplary embodiments.

Referring to FIG. 6A, in the related art voltage positioning scheme, the output voltage Vout has switching noises between a maximum value Vmax and a minimum value Vmin when the load current ILOAD transitions.

Referring to FIG. 6B, according to the BVPC of FIG. 5, the output voltage Vout stably transitions, without switching noises, in an opposite direction with respect to the load current ILOAD between the maximum value Vmax and the minimum value Vmin when the load current ILOAD transitions.

Referring to FIG. 6C, according to the BVPC of FIG. 5, the output voltage Vout stably transitions, without switching noises, in the same direction as the load current ILOAD between the maximum value Vmax and the minimum value Vmin when the load current ILOAD transitions.

Figure 7:
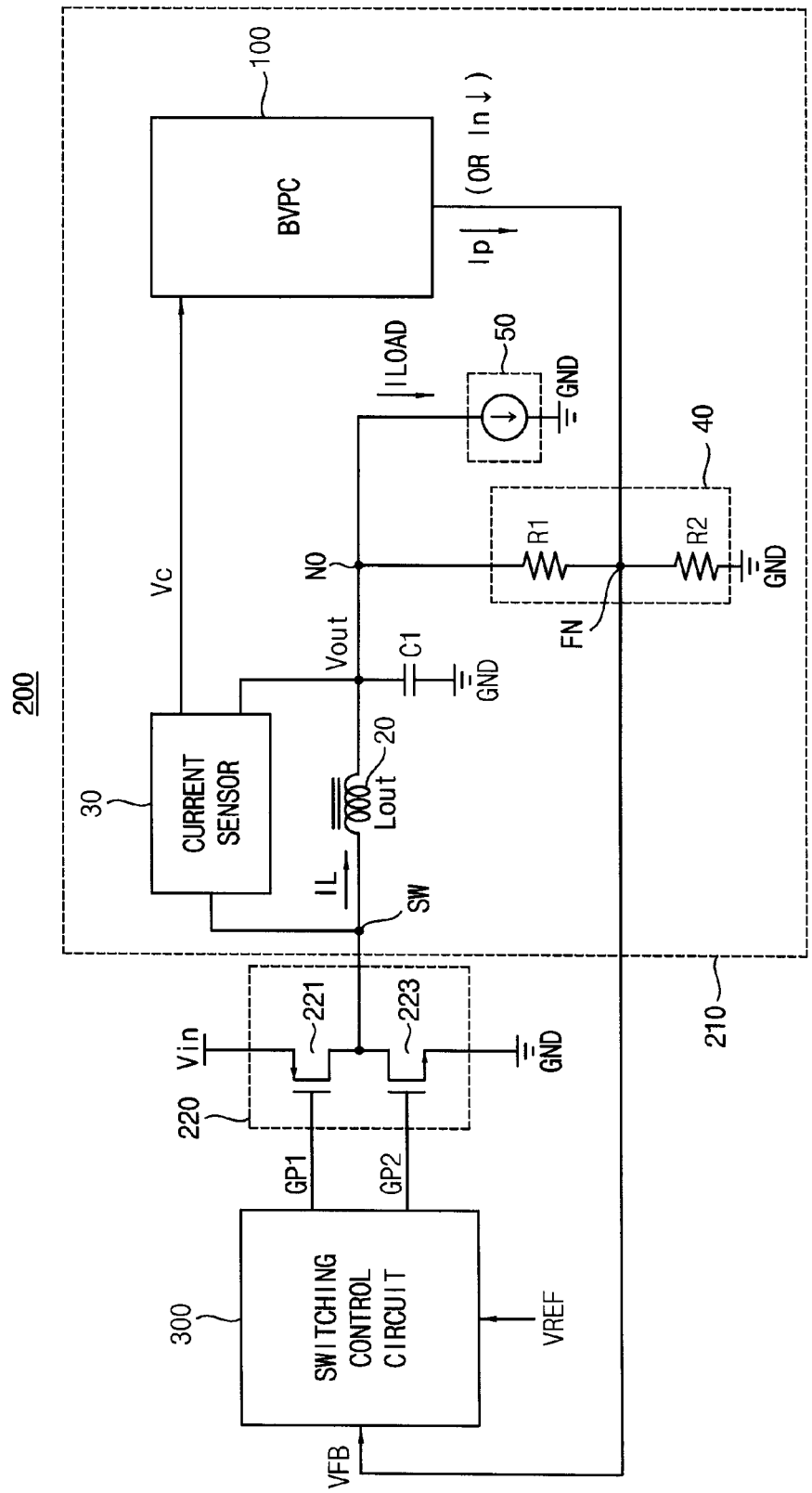
FIG. 7 is a block diagram illustrating a voltage converter including a BVPC according to an exemplary embodiment.

FIG. 7 is a block diagram illustrating a voltage converter including a BVPC according to an exemplary embodiment.

Referring to FIG. 7, a voltage converter 200 includes a switching control circuit 300, a switching device unit 220 and an output circuit 210. The output circuit 210 may include the output coil 20, the current sensor 30, the feedback unit 40 and the BVPC 100. The load 50 is illustrated for illustrative convenience in FIG. 7, however, the output circuit 210 may not include the load 50. In addition, a smoothing capacitor C1 is connected between the output node NO and the ground voltage GND.

The output coil 20 is connected between the switching node SW and the output node NO, and the output coil 20 charges an input power supply voltage Vin or discharges the charged voltage. The current sensor 30 is connected between the switching node SW and the output node NO in parallel with the output coil 20. The current sensor 30 senses an inductor current IL flowing through the output coil 20 and outputs the sensing voltage Vc based on the sensed current. The BVPS 100 generates the second current Ip and the third current In to provide the feedback node FN with one of the second current Ip and the third current In according to the characteristic of the load 50 connected to the output node NO. The output voltage Vout of the output node NO is divided at the feedback node FN, the first and second currents Ip and In are real number multiple of the first current Id, and the first current Id is converted based on the sensing voltage Vc.

The feedback unit 40 includes the first and second resistors R1 and R2 connected in series between the output node NO and the ground voltage GND and the first and second resistors R1 and R2 are connected to each other at the feedback node FN. The output voltage Vout is divided according a ratio of the first and second resistors R1 and R2 at the feedback node FN. The feedback unit 40 provides a feedback voltage VFB to the switching control circuit 300. Although in FIG. 7, the reference voltage VREF is provided to the switching control circuit 300, the reference voltage VREF may be generated in the switching control circuit 300 in some exemplary embodiments.

The switching control circuit 300 compares the feedback voltage VFB and the reference voltage VREF to generate first and second driving control signals GP1 and GP2 for controlling charge and/or discharge of the output coil 20. The switching device unit 220 charges the input power supply voltage Vin in the output coil 20 or discharges the output coil 20 in response to the first and second driving control signals GP1 and GP2.

The switching device unit 220 includes first and second switching devices 221 and 223 connected in series between the input power supply voltage Vin and the ground voltage GND. The first switching device 221 charges the input power supply voltage Vin in the output coil 20 in response to the first driving control signal GP1. The second switching device 223 discharges the output coil 20 in response to the second driving control signal GP2. The first switching device 221 includes a PMOS transistor that has a source receiving the input power supply voltage Vin, a gate receiving the first driving control signal GP1 and a drain connected to the switching node SW. The second switching device 223 includes an NMOS transistor that has a drain connected to the switching node SW, a gate receiving the second driving control signal GP2 and a source connected to the ground voltage GND. In some exemplary embodiments, the first switching device 221 may include an NMOS transistor and the second switching device 223 may include a PMOS transistor.

Figure 8:
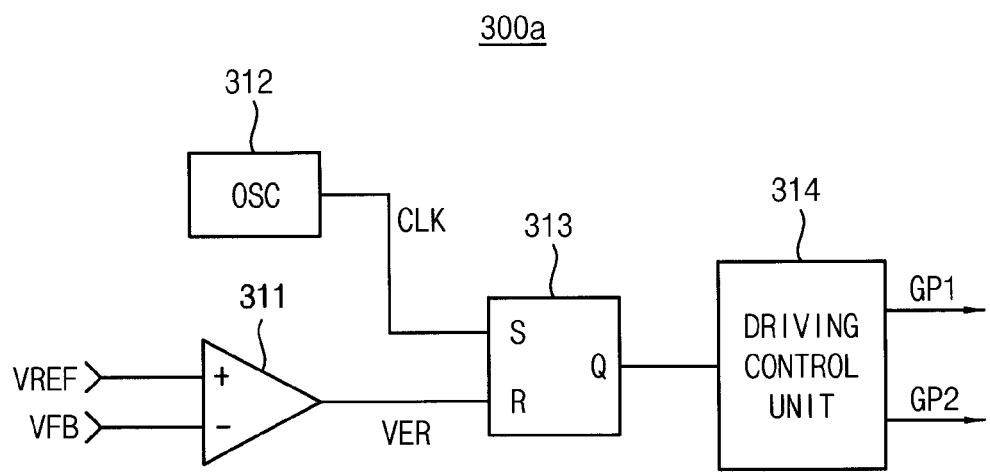
FIG. 8 illustrates an example of a switching control circuit in FIG. 7 according to an exemplary embodiment.

FIG. 8 illustrates an example of a switching control circuit in FIG. 7 according to an exemplary embodiment.

Referring to FIG. 8, a switching control circuit 300a includes a comparator 311, an oscillator OSC 312, a flip-flop 313 and a driving control unit 314.

The comparator 311 compares the reference voltage VREF and the feedback voltage VFB to output an error voltage VER according to a comparison result. The comparator 311 may output the error voltage VER with a high level when the reference voltage VREF is equal to or greater than the feedback voltage VFB. The oscillator OSC 312 generates a clock pulse CLK which has a predetermined frequency and a relatively narrow pulse width. The flip-flop 313 receives the error voltage VER and the clock pulse CLK and provides an output signal Q to the driving control unit 314. The driving control unit 314 determines on/off timing of the first and second driving control signals GP1 and GP2 according to the output signal Q of the flip-flop 313. The flip-flop 313 may be implemented with an RS flip-flop that has a set terminal S receiving the clock pulse CLK and a reset terminal R receiving the error voltage VER.

The driving control unit 314 may generate the first and second driving control signals GP1 and GP2 which have a dead time to prevent the first and second switching devices 221 and 223 from being turned-on together and causing a through-current. The comparator 311 may have a hysteresis property so that the output of the comparator 311 may be prevented from erroneously changing when a noise is entered into the feedback voltage VFB.

Figure 9:
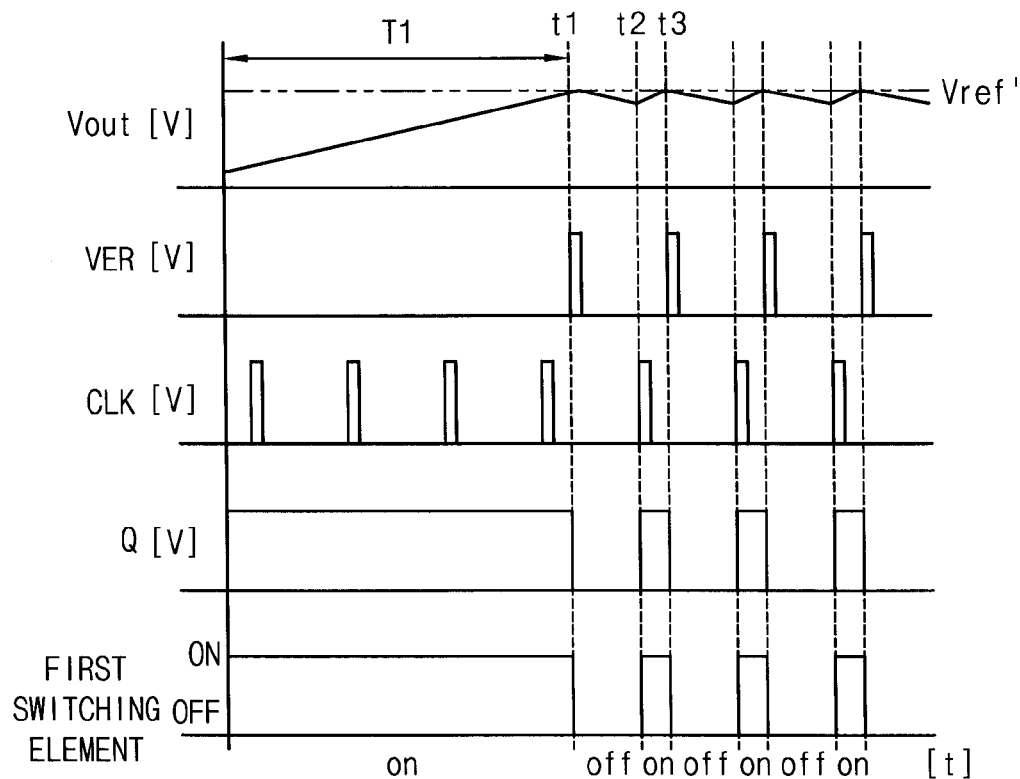
FIG. 9 is a timing diagram illustrating various signals in the switching control circuit of FIG. 8.

FIG. 9 is a timing diagram illustrating various signals in the switching control circuit of FIG. 8.

Hereinafter, operations of the voltage converter of FIG. 7 will be described with reference to FIGS. 7 through 9.

In FIG. 9, Vref' represents an electric potential of the output voltage Vout in a case where the feedback voltage VFB is the same as the reference voltage VREF.

In the voltage converter 200 of FIG. 7, when the output voltage Vout is lower than the Vref', that is, the feedback voltage VFB is lower than the reference voltage VREF during period T1, the error voltage VER output from the comparator 311 is at a low level. During the period T1, the output signal Q of the flip-flop 313 is at a high level, and the driving control unit 314 outputs the first and second driving control signals GP1 and GP2 which turn on the first switching device 221 and turn off the second switching device 223, respectively.

As a result, the output voltage Vout gradually increases, and a voltage at the feedback node FN increases accordingly during the period T1. When the output voltage Vout becomes equal to or higher than Vref', the error voltage VER changes from the low level to a high level to reset the flip-flop 313, and the output signal Q of the flip-flop 313 changes to a low level at a timing t1. Then, the driving control unit 314 outputs the first and second driving control signals GP1 and GP2 which turn off the first switching device 221 and turn on the second switching device 223, respectively.

The clock pulse CLK is periodically inputted to the set terminal S of the flip-flop 313. When the clock pulse CLK is inputted to the set terminal S thereof at a timing t2, the flip-flop 313 is set, and the output signal Q changes to the high level. Then, again, the driving control unit 314 outputs the first and second driving control signals GP1 and GP2 which turn on the first switching device 221 and turn off the second switching device 223, respectively. Thus, an amount of the inductor current IL becomes greater than that of the load current ILOAD flowing through the load 50, and hence the output voltage Vout increases again.

When the output voltage Vout becomes equal to or higher than the Vref', the error voltage VER changes from the low level to the high level to reset the flip-flop 313, and the output Q changes to the low level at a timing t3. Then, the driving control unit 314 outputs the first and second driving control signals GP1 and GP2 which turn off the first switching device 221 and turn on the second switching device 223, respectively. While the switching control circuit 300a repeats the above-described operation, one of the second current Ip and the third current In may be applied to the feedback node FN according to the load 50 connected to the output node NO. Therefore, the voltage converter 200 may decrease or increase the level of the output voltage Vout according to the load 50 connected to the output node NO as the load current ILOAD increases according to the equation 4 or the equation 5.

Figure 10:
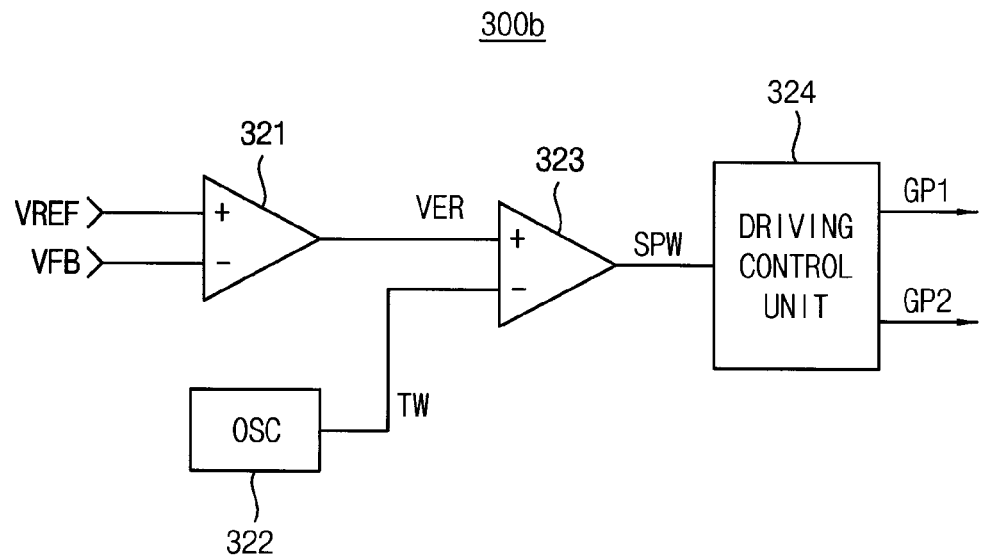
FIG. 10 illustrates an example of the switching control circuit in FIG. 7 according to another exemplary embodiment.

FIG. 10 illustrates an example of the switching control circuit in FIG. 7 according to another exemplary embodiment.

Referring to FIG. 10, a switching control circuit 300b includes a comparator 321, an oscillator OSC 322, a pulse width modulation (PWM) comparator flip-flop 323 and a driving control unit 324.

The comparator 321 compares the reference voltage VREF and the feedback voltage VFB to output the error voltage VER according to the comparison result. The comparator 321 may output the error voltage VER with a high level when the reference voltage VREF is equal to or greater than the feedback voltage VFB. The oscillator OSC 322 generates a triangular wave signal TW which has a predetermined frequency. The PWM comparator 323 compares the error voltage VER and the triangular wave signal TW and generates a pulse signal SPW to be output to the driving control unit 324 according to the comparison result. The driving control unit 324 determines on/off timing of the first and second driving control signals GP1 and GP2. Particularly, the driving control unit 324 may determine the on/off timing of the first and second driving control signals GP1 and GP2 according to the pulse signal SPW.

The driving control unit 324 may generate the first and second driving control signals GP1 and GP2 which have a dead time to prevent the first and second switching devices 221 and 223 from being turned-on together and causing a through-current. The comparator 321 may have a hysteresis property so that the output of the comparator 321 may be prevented from erroneously changing when a noise is entered into the feedback voltage VFB.

Figure 11:
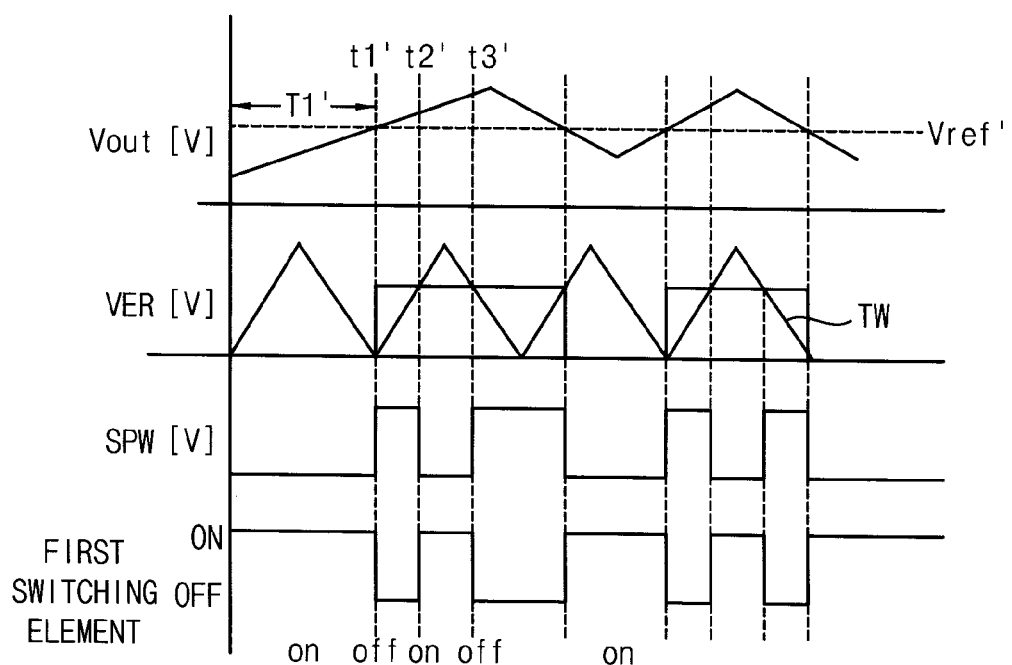
FIG. 11 is a timing diagram illustrating various signals in the switching control circuit of FIG. 10.

FIG. 11 is a timing diagram illustrating various signals in the switching control circuit of FIG. 10.

Hereinafter, operations of the voltage converter of FIG. 7 will be described with reference to FIGS. 7, 10 and 11.

In FIG. 11, Vref' represents an electric potential of the output voltage Vout in a case where the feedback voltage VFB is same as the reference voltage VREF.

In the voltage converter 200 of FIG. 7, when the output voltage Vout is lower than the Vref', that is, the feedback voltage VFB is lower than the reference voltage VREF during period T1', the error voltage VER output from the comparator 321 is at a low level. During the period T1', the pulse signal SPW is at a low level, and the driving control unit 324 outputs the first and second driving control signals GP1 and GP2 which turn on the first switching device 221 and turn off the second switching device 223, respectively.

As a result, the output voltage Vout gradually increases, and a voltage at the feedback node FN increases accordingly during the period T1'. When the error voltage VER becomes higher than the triangular wave signal TW, the PWM comparator 323 outputs the pulse signal SPW at a high level. When the pulse signal SPW changes to and maintains a high level between timings t1' and t2', the driving control unit 324 outputs the first and second driving control signals GP1 and GP2 which turn off the first switching device 221 and turn on the second switching device 223, respectively. In addition, when the pulse signal SPW changes to and maintains a low level between timings t2' and t3', the driving control unit 324 outputs the first and second driving control signals GP1 and GP2 which turn on the first switching device 221 and turn off the second switching device 223, respectively.

While the switching control circuit 300b repeats the above-described operation, one of the second current Ip and the third current In may be applied to the feedback node FN according to the load 50 connected to the output node NO. Therefore, the voltage converter 200 may decrease or increase the level of the output voltage Vout according to the load 50 connected to the output node NO as the load current ILOAD increases according to the equation 4 or the equation 5. In an exemplary embodiment, when the load 50 is an application processor, the voltage converter 200 may decrease the level of the output voltage Vout as the load current ILOAD increases according to the equation 4. In another exemplary embodiment, when the load 50 is a low drop-out (LDO) regulator, the voltage converter 200 may increase the level of the output voltage Vout as the load current ILOAD increases according to the equation 5. Therefore, the voltage converter 200 may adaptively perform bi-directional voltage positioning operation according to the characteristic of the load 50. In addition, the first and second switching devices 221 and 223 are turned on/off complementarily to each other.

Figure 12:
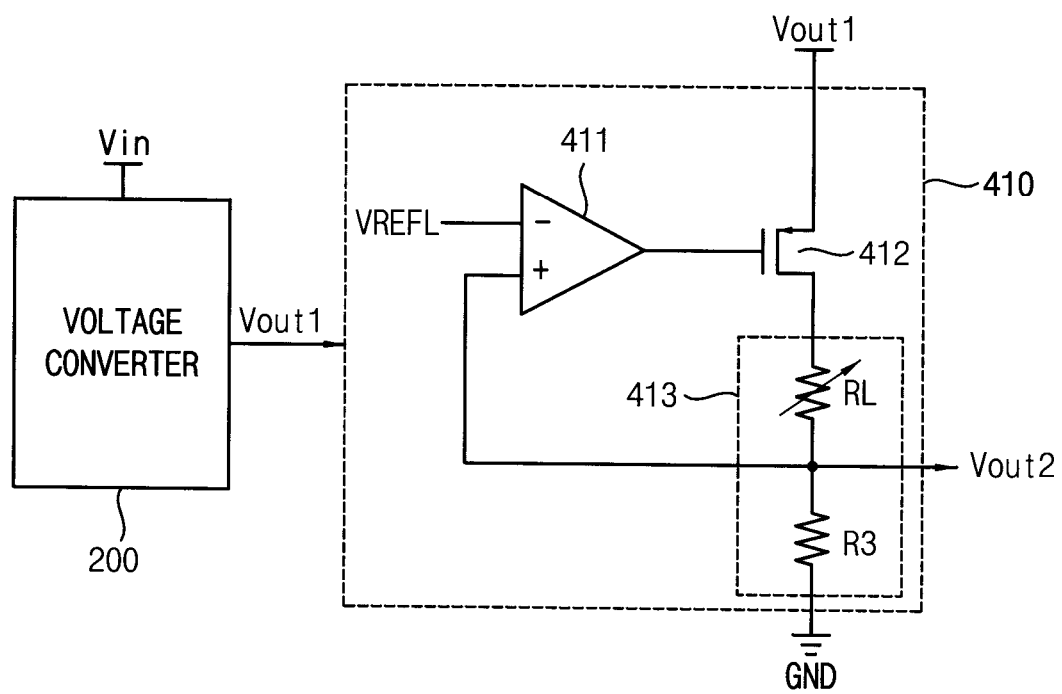
FIG. 12 is a block diagram illustrating a power supply device according to an exemplary embodiment.

FIG. 12 is a block diagram illustrating a power supply device according to an exemplary embodiment.

Referring to FIG. 12, a power supply device 400 includes the voltage converter 200 and an LDO regulator 410 that operates as a load.

The voltage converter 200 may employ substantially the same configuration as the voltage converter 200 of FIG. 7. Therefore, the voltage converter 200 may include the switching control circuit 300, the switching device unit 220 and the output circuit 210. The output circuit 210 may include the output coil 20, the current sensor 30, the feedback unit 40 and the BVPC 100. As described with reference to FIG. 7, the voltage converter 200 generates the second current Ip and the third current In to provide the feedback node FN with one of the second current Ip and the third current In according to the characteristic of the load 50 connected to the output node NO. The output voltage Vout of the output node NO is divided at the feedback node FN, the first and second currents Ip and In are real number multiple of the first current Id, and the first current Id is converted based on the sensing voltage Vc. That is, the voltage converter 200 converts the input power supply voltage Vin to a first output voltage Vout1 having a regular level and provides the first output voltage Vout1 to the load 410. The voltage converter 200 may be referred to as a sub-regulator.

In FIG. 12, the load 410 may be implemented with the LDO regulator 410. When the load 410 is implemented with the LDO regulator 410, the voltage converter 200 provides the third current In to the feedback node FN, and the voltage converter 200 may increase the level of the output voltage Vout as the load current ILOAD increases according to the equation 5.

The LDO regulator 410 includes an operational amplifier 411, a PMOS transistor 412 and a voltage division unit 413. The voltage division unit 413 includes a variable resistor RL and a third resistor R3 connected in series between the PMOS transistor 412 and the ground voltage GND. The variable resistor RL and the third resistor R3 are connected to each other in series at a connection node. That is, a second output voltage Vout2 is provided to an actual load. Since the voltage converter 200 performs a negative voltage positioning operation when the load 410 is the LDO regulator, the sub-regulator 200 may increase the level of the first output voltage Vout1 as the load current increases.

The operational amplifier 411 has a second (or negative) input terminal receiving a reference voltage VREFL, a first (or positive) input terminal connected to the connection node and an output terminal connected to a gate of the PMOS transistor 412. The second output voltage Vout2 is provided at the connection node of the voltage division unit 413.

In FIG. 12, the voltage converter 200 serves as a sub-regulator of the LDO regulator, and the voltage converter 200 may increase the level of the first output voltage Vout1 as the load current (or output current) flowing into the LDO regulator 410 increases.

Figure 13:
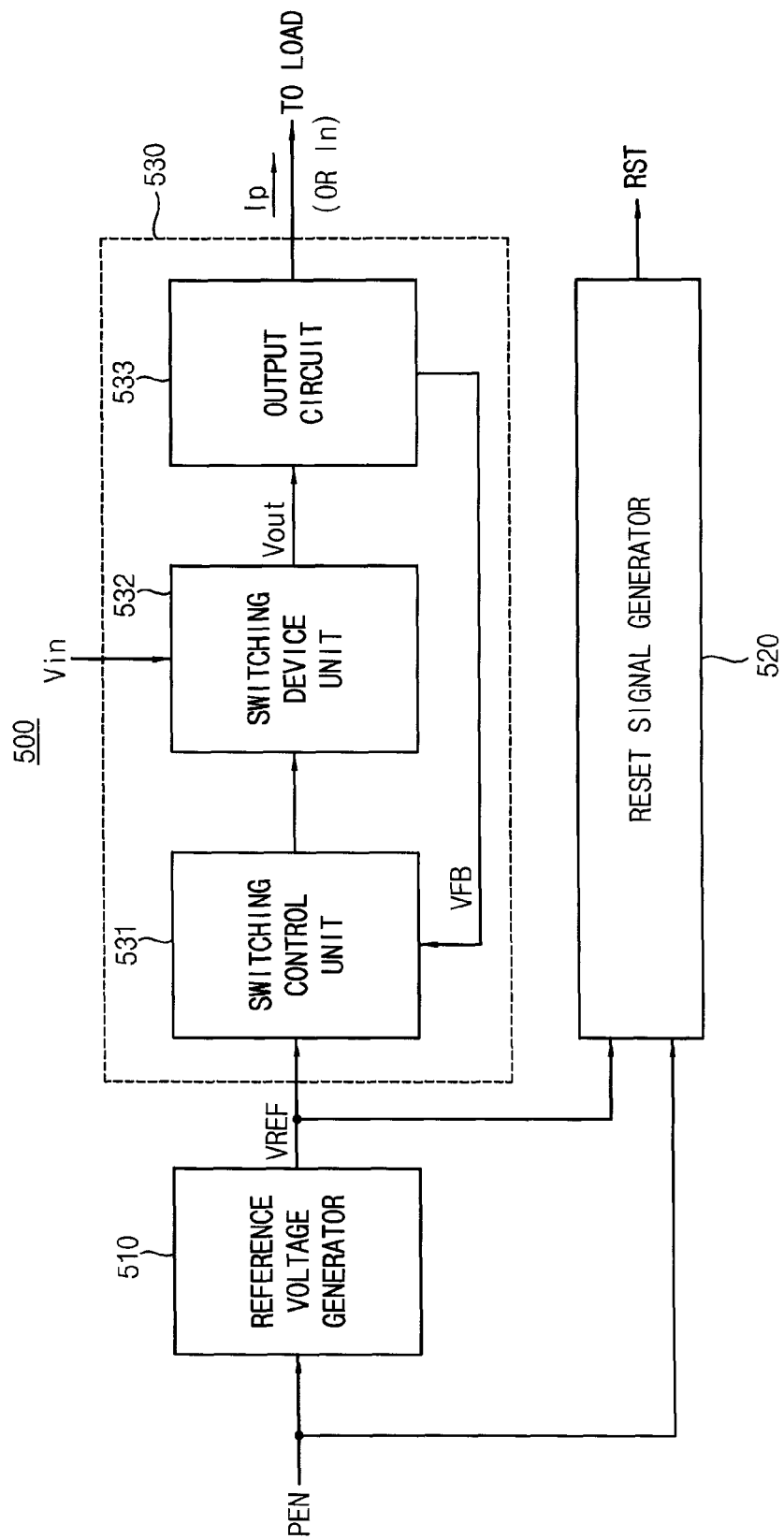
FIG. 13 is a block diagram illustrating a power management device according to an exemplary embodiment.

FIG. 13 is a block diagram illustrating a power management device according to an exemplary embodiment.

Referring to FIG. 13, a power management device 500 includes a reference voltage generator 510, a reset signal generator 520 and a voltage converter 530. The reference voltage generator 510 generates a reference voltage VREF based on a power enable signal PEN. Although not illustrated in FIG. 13, the reference voltage generator 510 may be implemented with resistors used as a voltage divider for generating the reference voltage VREF. In a case where a more stable reference voltage is required, the reference voltage generator 510 may be implemented with a band-gap reference voltage circuit. As known to one of ordinary skill in the art, the band-gap reference voltage circuit may provide a stable reference voltage that is insensitive to a temperature variation. The band-gap reference voltage circuit may include a start-up circuit, at least one transistor, at least one resistor, etc.

The reset signal generator 520 generates a reset signal RST based on the power enable signal PEN and the reference voltage VREF. Although not illustrated in FIG. 13, the reset signal generator 520 may include a reset enable unit, a reset disable unit and a latch unit. The reset enable unit generates a reset enable signal based on the power enable signal PEN. The reset disable unit generates a reset disable signal based on the first reference voltage VREF and the reset enable signal. The latch unit generates the reset signal RST based on the reset enable signal and the reset disable signal.

As described with reference to FIG. 7, the voltage converter 530 generates the second current Ip and the third current In to provide the feedback node FN with one of the second current Ip and the third current In according to the characteristic of the load 50 connected to the output node NO. The output voltage Vout of the output node NO is divided at the feedback node FN, the first and second currents Ip and In are real number multiple of the first current Id, and the first current Id is converted based on the sensing voltage Vc sensed in the output coil 20. The voltage converter 530 may charge the input power supply voltage Vin in the output coil 20 or may discharge the output coil 20 in response to the first and second driving control signals GP1 and GP2 based on a difference between the feedback voltage VFB of the feedback node FN and the reference voltage VREF. The voltage converter 530 may decrease or increase the level of the output voltage Vout according to the load 50 connected to the output node NO as the load current ILOAD increases according to the equation 4 or the equation 5.

The voltage converter 530 includes a switching control circuit 531, a switching device unit 532 and an output circuit 533. The switching control circuit 531, the switching device unit 532 and the output circuit 533 may have substantially the same architecture and operation as those of the switching control circuit 300, the switching device unit 220 and the output circuit 210 of FIG. 7, respectively.

Figure 14:
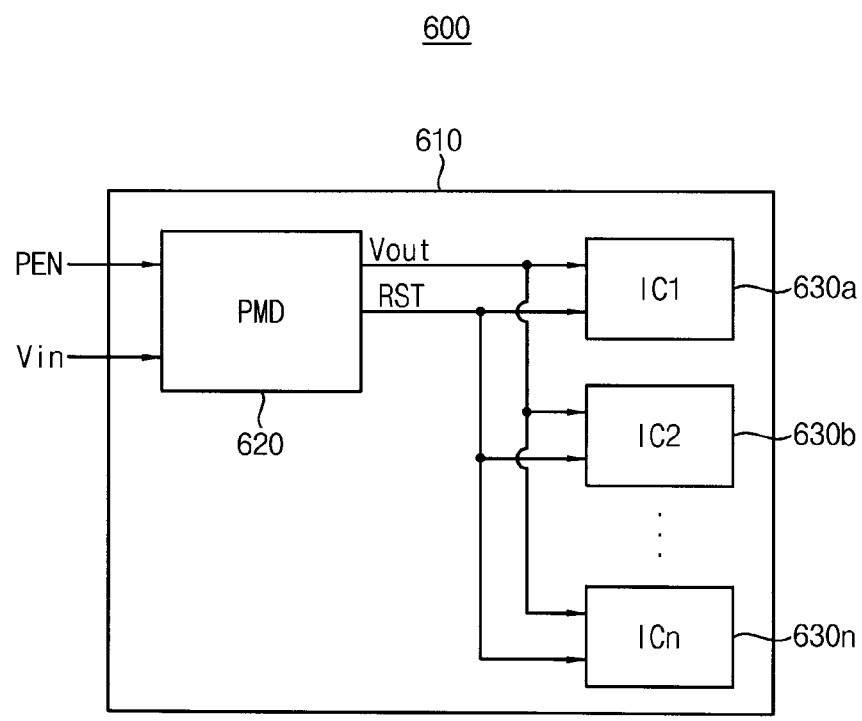
FIG. 14 is a block diagram illustrating a power management system according to an exemplary embodiment.

FIG. 14 is a block diagram illustrating a power management system, according to an exemplary embodiment.

Referring to FIG. 14, a power management system 600 includes a power management device 620 and a plurality of integrated circuits 630a, 630b, . . . , 630n. The power management device 620 and the plurality of integrated circuits 630a, 630b, . . . , 630n may be formed on a printed circuit board (PCB) 610.

The power management device 620 may have substantially the same configuration as that of the power management device 500 of FIG. 13, for example. The power management device 620 generates an output voltage Vout whose level is increased or decreased according to the load based on the input power supply voltage Vin, and generates a reset signal RST based on a power enable signal PEN.

The integrated circuits 630a, 630b, . . . , 630n maintain a reset state based on the reset signal RST until the output power supply voltage Vout reaches a steady-state. After the output voltage Vout reaches the steady-state, the integrated circuits 630a, 630b, . . . , 630n may be operated and driven based on the output voltage Vout. Each of the circuits 630a, 630b, . . . , 630n, which operates as a load may select one of levels of the output voltages according to the equation 4 and the equation 5 and may be driven based on the selected output voltage.

Figure 15:
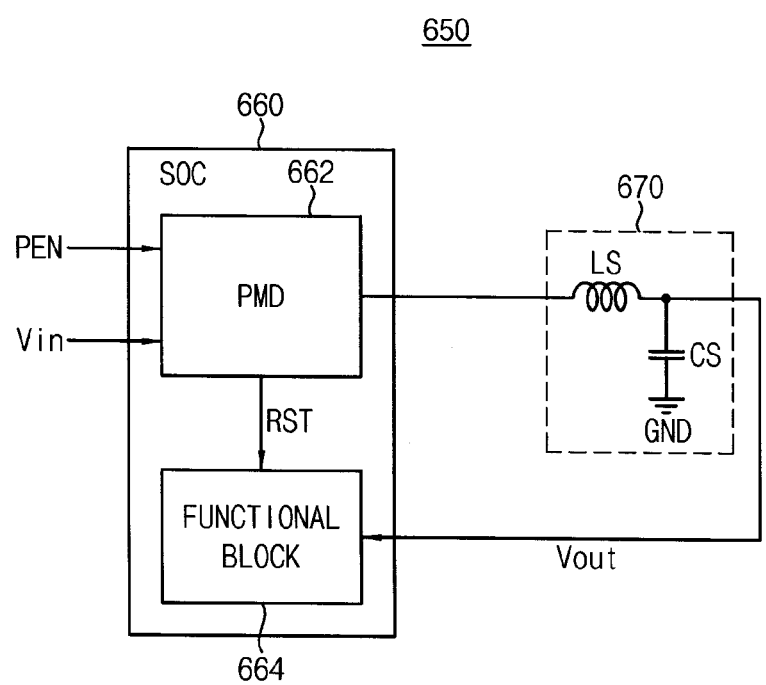
FIG. 15 is a block diagram illustrating a power management system according to another exemplary embodiment.

FIG. 15 is a block diagram illustrating a power management system according to another exemplary embodiment.

Referring to FIG. 15, a power management system 650 includes a system on chip (SoC) 660 and a filter 670. The SoC 660 includes a power management device 662 and a functional block 664.

The power management device 662 may have substantially the same configuration as that of the power management device 500 of FIG. 13, for example. The power management device 662 generates an output voltage Vout whose level is increased or decreased according to the load based on the input power supply voltage Vin, and generates a reset signal RST based on a power enable signal PEN. The voltage converter included in the power management device 662 may have substantially the same configuration as described with reference to FIG. 7 and generate the second current Ip and the third current In to provide the feedback node FN with one of the second current Ip and the third current In according to the characteristic of the load 50 connected to the output node NO. The output voltage Vout of the output node NO is divided at the feedback node FN, the first and second currents Ip and In are real number multiple of the first current Id, and the first current Id is converted based on the sensing voltage Vc. Therefore, the power management device 662 may generate an output current whose level is increased or decreased according to a characteristic of the functional block 664.

The filter 670 may be implemented as a low-pass filter having an inductor LS and a capacitor CS. A stable output voltage Vout is induced based on the output current flowing through the inductor LS.

The functional block 664 maintains a reset state based on the reset signal RST until the output power supply voltage VOUT reaches a steady-state. After the output voltage Vout reaches the steady-state, the functional block 664 may be operated and driven based on the output voltage Vout.

Although FIG. 15 illustrates an example of the power management system 650 including the filter 670 disposed outside of the SoC 660, the filter 670 alternatively may be disposed inside the SoC 660.

Figure 16:
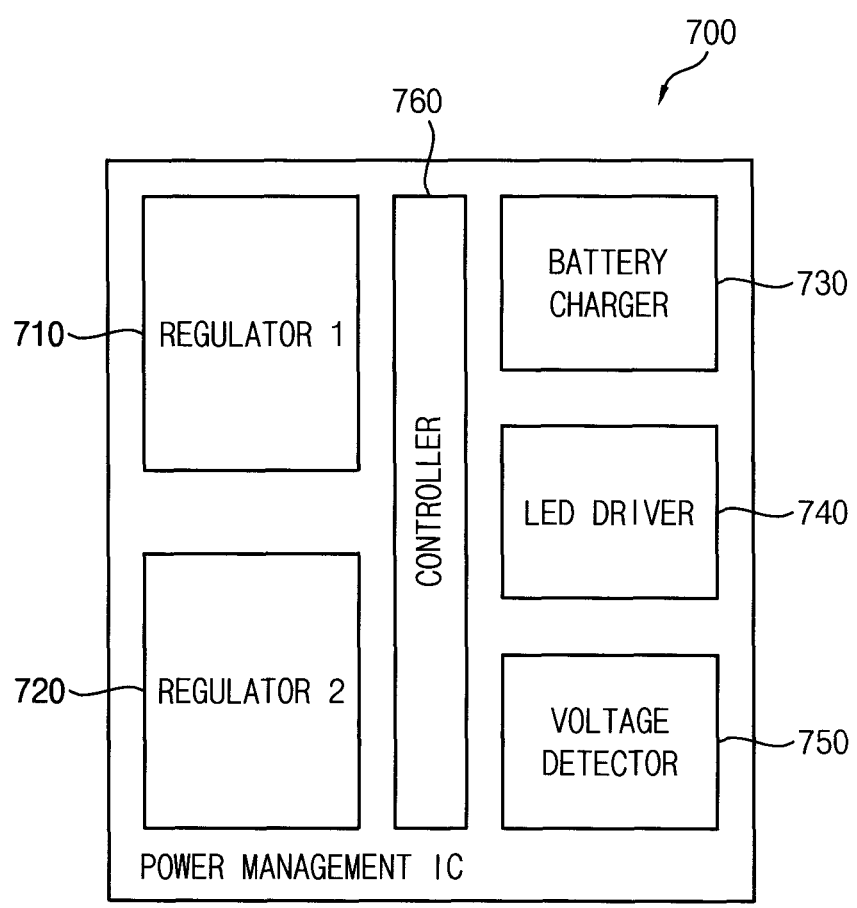
FIG. 16 is a block diagram illustrating a power management integrated circuit (IC) including the voltage converter of FIG. 7 according to an exemplary embodiment.

FIG. 16 is a block diagram illustrating a power management integrated circuit (IC) including the voltage converter of FIG. 7 according to an exemplary embodiment.

Referring to FIG. 16, a power management IC 700 is an integrated circuit for managing electric power. The power management IC 700 is used for electronic devices such as a mobile phone, a portable multimedia player (PMP), and the like.

The power management IC 700 includes at least one regulator (for example, a first regulator 710 or a second regulator 720). The first and/or second regulator(s) 710 and/or 720 provide power to components of an electronic device (not shown). The first and/or second regulator(s) 710 and/or 720 may include the voltage converter 200 of FIG. 7. The first regulator 710 may be a linear regulator, and the second regulator 720 may be the voltage converter 200. Therefore, the second regulator 720 may perform a bi-directional voltage positioning operation that increases or decreases the level of the output voltage according to the characteristic of the load connected to the output node.

According to an exemplary embodiment, the power management IC 700 may include various components, for example, a battery charger 730, a light emitting diode (LED) driver 740, a voltage detector 750, or a controller 760.

The battery charger 730 may charge a battery (not shown) under control of the controller 760. The LED driver 740 may operate an LED (not shown) of the electronic device under the control of the controller 760. The voltage detector 750 is a sensor capable of detecting a voltage of the electronic device. The controller 760 may further control an operation of the first and second regulators 710 and 720.

Figure 17:
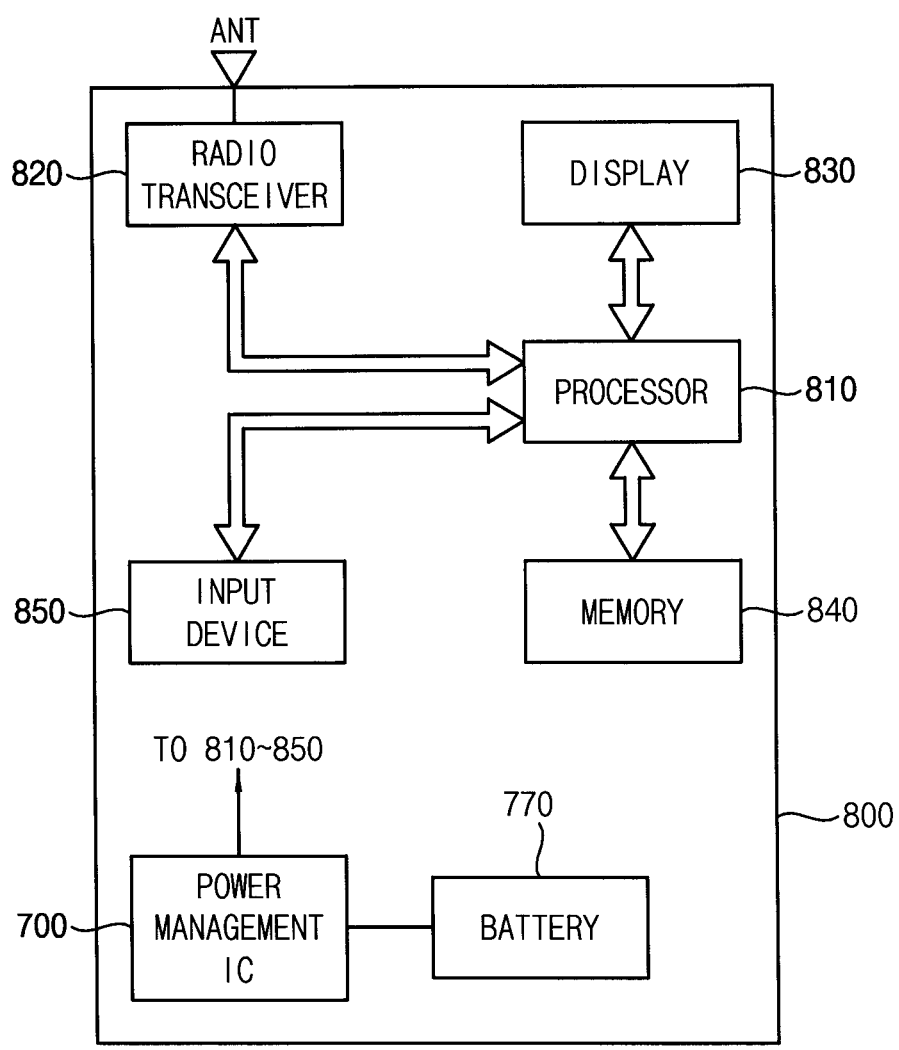
FIG. 17 is a block diagram illustrating an example of an electronic device including the voltage converter of FIG. 7 according to an exemplary embodiment.

FIG. 17 is a block diagram illustrating an example of an electronic device including the voltage converter of FIG. 7 according to exemplary embodiments.

Referring to FIG. 17, an electronic device 800, for example, a cellular phone, a smart phone, or a tablet personal computer (PC), includes a power management IC 700 and a battery 770. The power management IC 700 is provided with power from the battery 770 and is configured to manage power of a processor 810, a wireless transmitter-receiver 820, a display 830, a memory 840, or an input device 850. The power management IC 700 includes the voltage converter 200 of FIG. 7. Therefore, the power management IC 700 may perform a bi-directional voltage positioning operation that increases or decreases the level of the output voltage according to the characteristic of the load connected to the output node.

The wireless transmitter-receiver 820 may transmit or receive a radio signal through an antenna ANT. For example, the wireless transmitter-receiver 820 may convert the radio signal received through the antenna ANT into a signal to be processed by the processor 810. Accordingly, the processor 810 may process the signal output from the wireless transmitter-receiver 820 and store the processed signal to the memory 840 or display the processed signal through the display 830.

The wireless transmitter-receiver 820 may convert the signal output from the processor 810 into a radio signal and output the converted radio signal to the outside through the antenna ANT. The input device 850 is a device capable of receiving an input for a control signal for controlling an operation of the processor 810 or a data to be processed by the processor 810, and may be implemented as, for example, a pointing device such as a touch pad, a computer mouse, a key pad, or a key board.

The processor 810 may control the display 830 to display a data output from the memory 840, a radio signal output from the wireless transmitter-receiver 820, or a data output from the input device 850.

Figure 18:
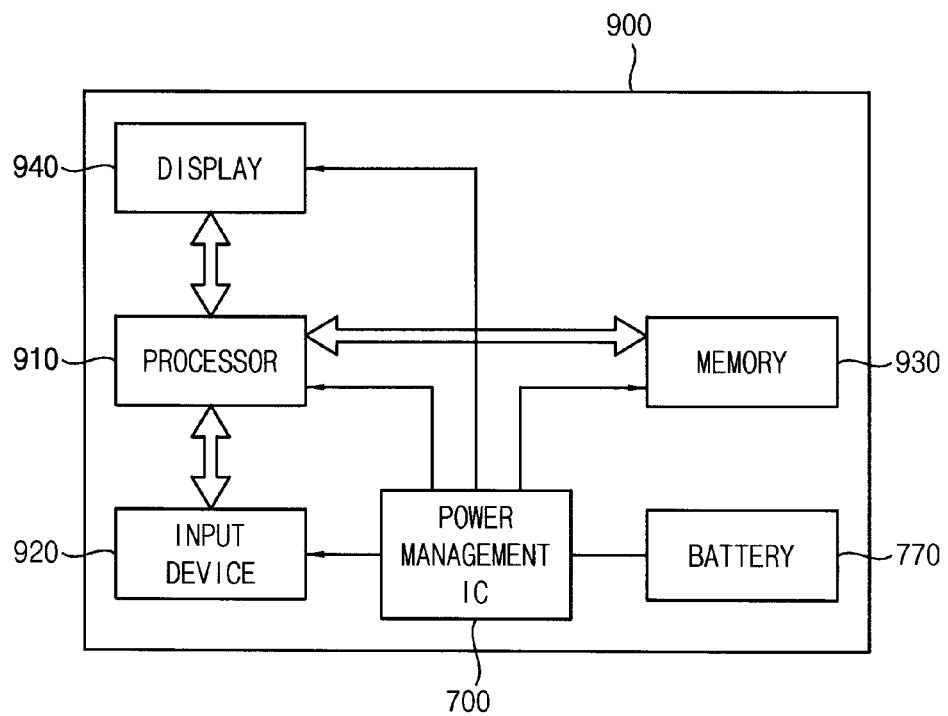
FIG. 18 is a block diagram illustrating an example of an electronic device including the voltage converter of FIG. 7 according to an exemplary embodiment.

FIG. 18 is a block diagram illustrating an example of an electronic device including the voltage converter of FIG. 7 according to an exemplary embodiment.

Referring to FIG. 18, an electronic device 900 may be implemented as a personal computer (PC), a tablet computer, a net-book, an e-reader, a personal digital assistant (PDA), a portable multimedia player (PMP), an MP3 player, or an MP4 player, and the electronic device 900 includes a power management IC 700 and a battery 770.

The power management IC 700 is provided with power from the battery 770 and may manage power of a processor 910, an input device 920, a memory 930, or a display 940. The power management IC 700 may include the voltage converter 200 of FIG. 7. Therefore, the power management IC 700 may perform a bi-directional voltage positioning operation that increases or decreases the level of the output voltage according to the characteristic of the load connected to the output node.

The electronic device 900 may include the processor 910 to control the general operation of the electronic device 900. The processor 910 may display a data stored to the memory 930 through the display 940 according to an input signal generated from the input device 920. For example, the input device 920 may be implemented as a pointing device such as a touch pad, a computer mouse, a key pad, or a key board.

Figure 19:
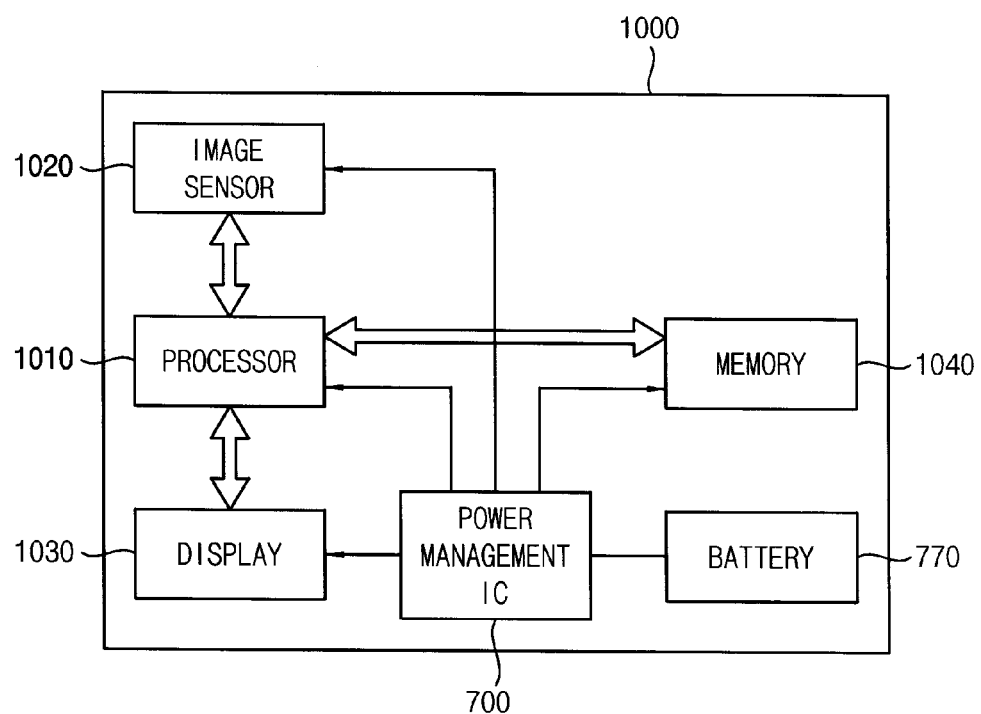
FIG. 19 is a block diagram illustrating an example of an electronic device including the voltage converter of FIG. 7 according to an exemplary embodiment.

FIG. 19 is a block diagram illustrating an example of an electronic device including the voltage converter of FIG. 7 according to an exemplary embodiment.

Referring to FIG. 19, an electronic device 1000 may be implemented as a digital camera and includes a power management IC 700 and a battery 770.

The power management IC 700 is provided with power from the battery 770 and may manage power of a processor 1010, an image sensor 1020, a memory 1040, or a display 1030. The power management IC 700 may include the voltage converter 200 of FIG. 7. Therefore, the power management IC 700 may perform a bi-directional voltage positioning operation that increases or decreases the level of the output voltage according to the characteristic of the load connected to the output node.

The image sensor 1020 of the electronic device 1000 may convert an optical signal into a digital signal, and the converted digital signal may be stored to the memory 1040 or displayed through the display 1030 under control of the processor 1010. Also, the digital signal stored to the memory 1040 may be displayed through the display 1030 under the control of the processor 1010.

Figure 20:
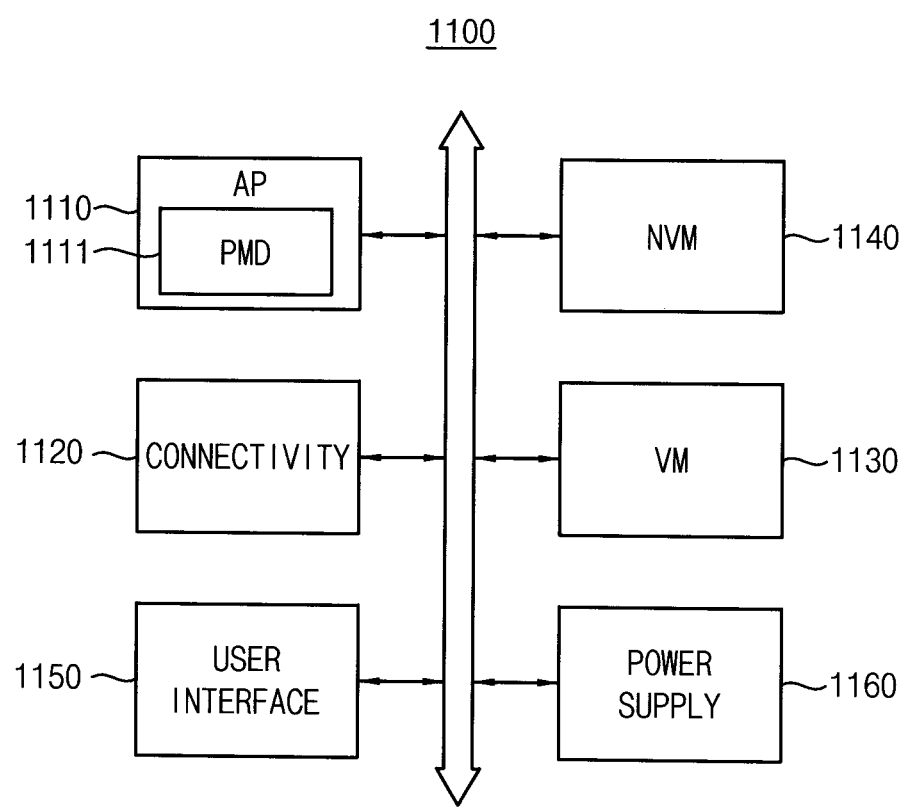
FIG. 20 is a block diagram illustrating a mobile system according to an exemplary embodiment.

FIG. 20 is a block diagram illustrating a mobile system according to an exemplary embodiment.

Referring to FIG. 20, a mobile system 1100 includes an application processor (AP) 1110, a connectivity unit 1120, a volatile memory (VM) device 1130, a nonvolatile memory (NVM) device 1140, a user interface 1150 and a power supply 1160. According to various exemplary embodiments, the mobile system 1100 may be any mobile system, such as a mobile phone, a smart phone, a personal digital assistant (PDA), a portable multimedia player (PMP), a digital camera, a portable game console, a music player, a camcorder, a video player, a navigation system, etc.

The application processor 1110 may execute applications, such as a web browser, a game application, a video player, etc. In some exemplary embodiments, the application processor 1110 may include a single core or multiple cores. For example, the application processor 1110 may be a multi-core processor, such as a dual-core processor, a quad-core processor, a hexa-core processor, etc. The application processor 1110 may include a power management device (PMD) 1111. The power management device 1111 generates an output voltage according to the characteristic of the load based on an input power supply voltage, and the power management device 1111 includes the voltage converter 200 of FIG. 7. The voltage converter generates a second current and a third current to provide the feedback node with one of the second current and the third current according to the characteristic of the load connected to the output node. The voltage converter may charge the input power supply voltage in an output coil or may discharge the output coil in response to first and second driving control signals based on difference between the feedback voltage of the feedback node and the reference voltage. According to various exemplary embodiments, the application processor 1110 may be coupled to an internal and/or external cache memory.

The connectivity unit 1120 may perform wired or wireless communication with an external device (not shown). For example, the connectivity unit 1120 may perform Ethernet communication, near field communication (NFC), radio frequency identification (RFID) communication, mobile telecommunication, memory card communication, universal serial bus (USB) communication, etc. In some exemplary embodiments, connectivity unit 1120 may include a baseband chipset that supports communications, such as global system for mobile communications (GSM), general packet radio service (GPRS), wideband code division multiple access (WCDMA), high speed downlink/uplink packet access (HSxPA), etc.

The volatile memory device 1150 may store data processed by the application processor 1110, or may operate as a working memory. For example, the semiconductor memory device 1150 may be a dynamic random access memory, such as a double data rate a synchronous dynamic random access memory (DDR SDRAM), a low power double data rate (LPDDR) SDRAM, a graphics double data rate (GDDR) SDRAM, a Rambus dynamic random access memory (RDRAM), etc., or may be any volatile memory device that requires a refresh operation. The volatile memory device 1150 may include the memory core 10 of FIG. 1 to have an open bit-line structure, and may further lower the voltage of a bit-line BL and a complementary bit-line BLB, or may perform a boosting operation with respect to the bit-line BL or the complementary bit-line BLB before charge sharing so that a voltage difference between the bit-line BL and the complementary bit-line BLB may be more increased. Accordingly, a bit-line sense amplifier may more stably perform a sensing operation.

The nonvolatile memory device 1140 may store a boot image for booting the mobile system 1100. For example, the nonvolatile memory device 1140 may be an electrically erasable programmable read-only memory (EEPROM), a flash memory, a phase change random access memory (PRAM), a resistance random access memory (RRAM), a nano floating gate memory (NFGM), a polymer random access memory (PoRAM), a magnetic random access memory (MRAM), a ferroelectric random access memory (FRAM), etc.

The user interface 1130 may include at least one input device, such as a keypad, a touch screen, etc., and at least one output device, such as a speaker, a display device, etc. The power supply 1160 may supply a power supply voltage to the mobile system 1100. In some exemplary embodiments, the mobile system 1100 may further include a camera image processor (CIS), and/or a storage device, such as a memory card, a solid state drive (SSD), a hard disk drive (HDD), a CD-ROM, etc.

In some exemplary embodiments, the mobile system 1100 and/or components of the mobile system 1100 may be packaged in various forms, such as package on package (PoP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat pack (TQFP), small outline IC (SOIC), shrink small outline package (SSOP), thin small outline package (TSOP), system in package (SIP), multi chip package (MCP), wafer-level fabricated package (WFP), or wafer-level processed stack package (WSP).

Figure 21:
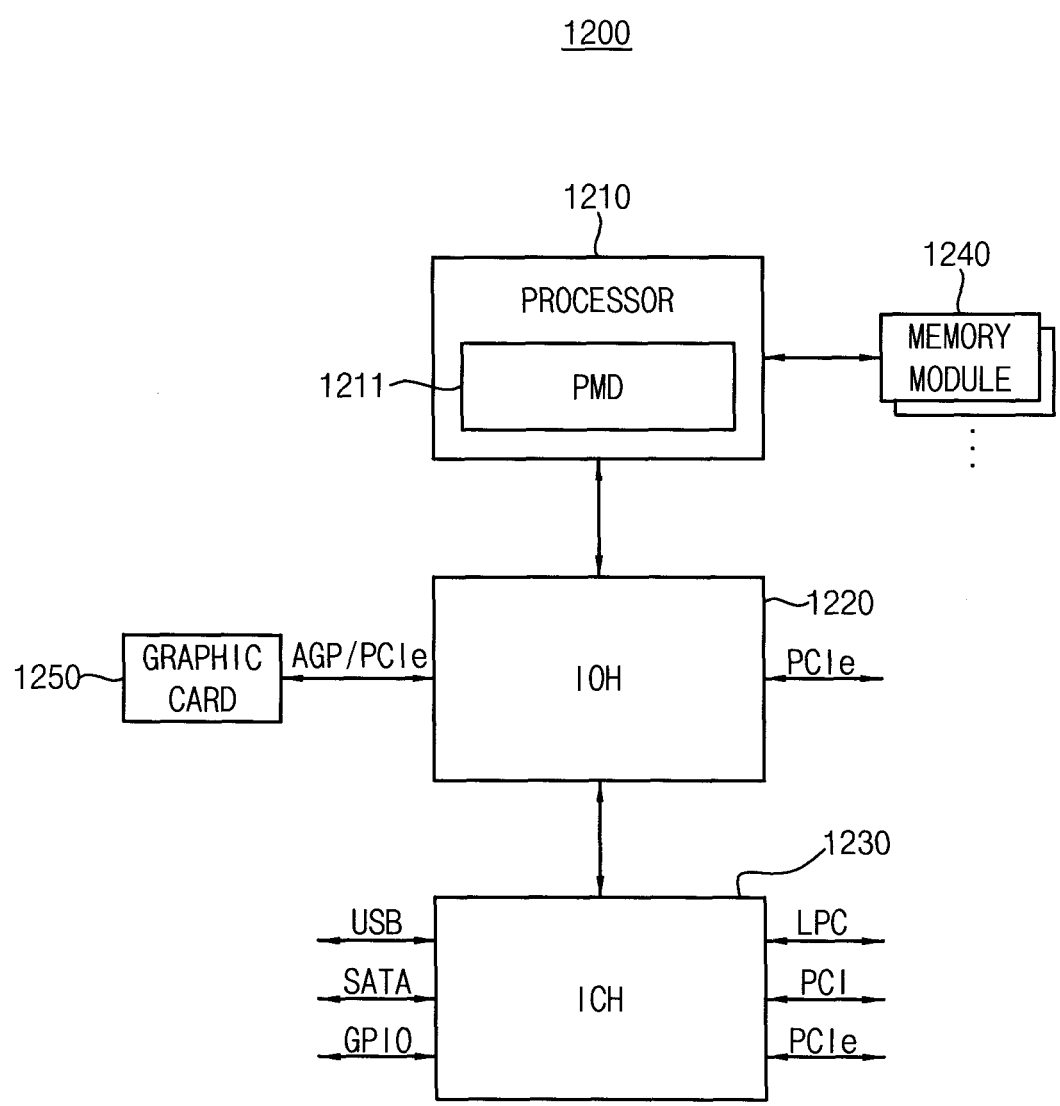
FIG. 21 is a block diagram illustrating a computing system according to an exemplary embodiment.

FIG. 21 is a block diagram illustrating a computing system according to an exemplary embodiment.

Referring to FIG. 21, a computing system 1200 includes a processor 1210, an input/output hub (IOH) 1220, an input/output controller hub (ICH) 1230, at least one memory module 1240 and a graphics card 1250. In some exemplary embodiments, the computing system 1200 may be a personal computer (PC), a server computer, a workstation, a laptop computer, a mobile phone, a smart phone, a personal digital assistant (PDA), a portable multimedia player (PMP), a digital camera, a digital television, a set-top box, a music player, a portable game console, a navigation system, etc.

The processor 1210 may perform various computing functions, such as executing specific software for performing specific calculations or tasks. For example, the processor 1210 may be a microprocessor, a central process unit (CPU), a digital signal processor, or the like. The processor 1210 may include a power management device (PMD) 1211. The power management device 1211 generates an output voltage according to the characteristic of the load based on an input power supply voltage, and the power management device 1211 includes the voltage converter 200 of FIG. 7. The voltage converter generates a second current and a third current to provide the feedback node with one of the second current and the third current according to a characteristic of the load connected to the output node. The voltage converter may charge the input power supply voltage in an output coil or may discharge the output coil in response to first and second driving control signals based on a difference between the feedback voltage of the feedback node and the reference voltage. In some exemplary embodiments, the processor 1210 may include a single core or multiple cores. For example, the processor 1210 may be a multi-core processor, such as a dual-core processor, a quad-core processor, a hexa-core processor, etc. Although FIG. 21 illustrates the computing system 1200 including one processor 1210, in some exemplary embodiments, the computing system 1200 may include a plurality of processors. The processor 1210 may include an internal or external cache memory.

The processor 1210 may include a memory controller (not shown) for controlling operations of the memory module 1240. The memory controller included in the processor 1210 may be referred to as an integrated memory controller (IMC). The memory controller may include a structure and/or perform methods of one or more of the exemplary embodiments described herein. A memory interface (not shown) between the memory controller and the memory module 1240 may be implemented with a single channel including a plurality of signal lines, or may bay be implemented with multiple channels, to each of which at least one memory module 1240 may be coupled. In some exemplary embodiments, the memory controller may be located inside the input/output hub 1220, which may be referred to as a memory controller hub (MCH).

The input/output hub 1220 may manage data transfer between the processor 1210 and devices, such as the graphics card 1250. The input/output hub 1220 may be coupled to the processor 1210 via various interfaces (not shown). For example, the interface between the processor 1210 and the input/output hub 1220 may be a front side bus (FSB), a system bus, a HyperTransport, a lightning data transport (LDT), a QuickPath interconnect (QPI), a common system interface (CSI), etc. Although FIG. 21 illustrates the computing system 1200 including one input/output hub 1220, in some exemplary embodiments, the computing system 1200 may include a plurality of input/output hubs. The input/output hub 1220 may provide various interfaces with the devices. For example, the input/output hub 1220 may provide an accelerated graphics port (AGP) interface, a peripheral component interface-express (PCIe), a communications streaming architecture (CSA) interface, etc.

The graphics card 1250 may be coupled to the input/output hub 1220 via the AGP or the PCIe. The graphics card 1250 may control a display device (not shown) for displaying an image. The graphics card 1250 may include an internal processor (not shown) for processing an image data and an internal memory device (not shown). In some exemplary embodiments, the input/output hub 1220 may include an internal graphics device (not shown) along with or instead of the graphics card 1250. The graphics device included in the input/output hub 1220 may be referred to as integrated graphics. Further, the input/output hub 1220 including the internal memory controller and the internal graphics device may be referred to as a graphics and memory controller hub (GMCH).

The input/output controller hub 1230 may perform data buffering and interface arbitration to efficiently operate various system interfaces. The input/output controller hub 1230 may be coupled to the input/output hub 1220 via an internal bus, such as a direct media interface (DMI), a hub interface, an enterprise Southbridge interface (ESI), PCIe, etc. The input/output controller hub 1230 may provide various interfaces with peripheral devices. For example, the input/output controller hub 1230 may provide a universal serial bus (USB) port, a serial advanced technology attachment (SATA) port, a general purpose input/output (GPIO), a low pin count (LPC) bus, a serial peripheral interface (SPI), PCI, PCIe, etc.

In some exemplary embodiments, the processor 1210, the input/output hub 1220 and the input/output controller hub 1230 may be implemented as separate chipsets or separate integrated circuits. In other exemplary embodiments, at least two among the processor 1210, the input/output hub 1220 and the input/output controller hub 1230 may be implemented as a single chipset.

As mentioned above, according to exemplary embodiments, since the BVPC may selectively provide the output voltage whose level is increased or decreased according to the characteristic of the load connected to the output node and the switching noises may be reduced, performance of the voltage convert and the power supply device may be enhanced.

The above described exemplary embodiments may be applied to an integrated circuit and/or an electronic system that requires a stable power supply voltage. For example, the above described exemplary embodiments may be applied to a power management device, a power management system, an application processor, a microprocessor, a CPU, an application-specific integrated circuit (ASIC), a mobile SoC, a multimedia SoC, a smartcard, and the like.

While the inventive concept has been described with reference to exemplary embodiments, it will be apparent to those skilled in the art that various changes and modifications may be made without departing from the spirit and scope of the present invention. Therefore, it should be understood that the above embodiments are not limiting, but illustrative.

What is claimed is:

1. A bi-directional voltage positioning circuit (BVPC), comprising:
   a voltage to current converter configured to convert a sensing voltage to a first current, the sensing voltage being sensed based on a current at an output coil connected between a switching node and an output node;
   a current mirror circuit configured to mirror the first current to generate a second current and a third current, the second current being N times greater than the first current, the third current being M times greater than the first current, N and M being real numbers greater than zero; and
   a switch configured to provide a feedback node with one of the second current and third current in response to a switching control signal, an output voltage of the output node being divided at the feedback node.

2. The BVPC of claim 1, wherein the output coil comprises an inductance of the output coil and a direct-current (DC) resistor connected to the inductance in series.

3. The BVPC of claim 2, wherein the output sensing voltage corresponds to a voltage between two ends of the DC resistor.

4. The BVPC of claim 1, wherein the voltage to current converter comprises:
   an operational amplifier connected to the output coil in parallel, the operational amplifier having a first input terminal connected to a first input node between a sensing resistor and a sensing capacitor connected in series with respect to each other between the switching node and the output node;
   an n-channel metal-oxide semiconductor (NMOS) transistor that has a drain connected to the current mirror circuit, a source connected to a second input terminal of the operational amplifier and a gate connected to an output terminal of the operational amplifier; and
   a droop resistor connected between the source of the NMOS transistor and the output node.

5. The BVPC of claim 4, wherein the first current corresponds to a value that the sensing voltage is divided by a resistance of the droop resistor.

6. The BVPC of claim 1, wherein the current mirror circuit comprises:
   a first p-channel metal-oxide semiconductor (PMOS) transistor connected between a power supply voltage and the voltage to current converter;
   a second PMOS transistor connected between the power supply voltage and the switch, the second PMOS transistor constituting a first current mirror with the first PMOS transistor;
   a third PMOS transistor connected to the power supply voltage, the third PMOS transistor constituting a second current mirror with the first PMOS transistor;
   a first n-channel metal-oxide semiconductor (NMOS) transistor connected between the third PMOS transistor and a ground voltage; and
   a second NMOS transistor connected between the switch and the ground voltage, the second NMOS transistor constituting a third current mirror with the first NMOS transistor.

7. The BVPC of claim 6, wherein a size of the second PMOS transistor is N times greater than a size the first PMOS transistor, a size of the third PMOS transistor is M times greater than the size the first PMOS transistor, and the first and second NMOS transistor have same sizes with respect to each other.

8. The BVPC of claim 7, wherein the second current is provided to the switch at a drain of the second PMOS transistor and the third current is provided to the switch at a drain of the second NMOS transistor.

9. The BVPC of claim 6, wherein the current mirror circuit further comprises a filter unit configured to filter a switching noise, the filter unit being connected between the first and second PMOS transistors.

10. The BVPC of claim 1, wherein one of the second current and the third current is selectively provided to the feedback node according to a characteristic of a load connected to the output node.

11. The BVPC of claim 10, wherein the output voltage is divided by first and second resistors connected in series between the output node and a ground voltage, the first and second resistors are connected to each other at the feedback node, and one of the second current and the third current is selectively provided to the feedback node.

12. The BVPC of claim 11, wherein the second current is provided to the feedback node when a level of the output voltage is to be decreased as a load current flowing into the load increases.

13. The BVPC of claim 11, wherein the third current is provided to the feedback node when a level of the output voltage is to be increased as a load current flowing into the load increases.

14. A voltage converter comprising:
   a current sensor configured to sense a current flowing through an output coil connected between a switching node and an output node to provide a sensing voltage based on the sensed current;
   a bi-directional voltage positioning circuit (BVPC) configured to generate a second current and a third current to provide a feedback node with one of the second current and third current according to a characteristic of a load connected to the output node, an output voltage of the output node being divided at the feedback node, the second and third currents being real number multiple of a first current, the first current being converted based on the sensing voltage;
   a switching control circuit configured to generate first and second driving control signals based on a feedback voltage and a reference voltage, the feedback voltage being obtained by dividing the output voltage; and
   a switching device unit configured to charge an input power supply voltage in the output coil or to discharge the output coil in response to the first and second driving control signals, wherein the BVPC comprises:
a voltage to current converter configured to convert the sensing voltage to the first current;
a current mirror circuit configured to mirror the first current to generate the second current and the third current, the second current being N times greater than the first current, the third current being M times greater than the first current, N and M being real numbers greater than zero; and
a switch configured to provide the feedback node with one of the second current and third current in response to a switching control signal.

15. The voltage converter of claim 14, wherein the switching control circuit comprises:
a comparator configured to compare the reference voltage and the feedback voltage to output an error voltage;
an oscillator configured to generate a clock pulse;
a flip-flop configured to provide an output signal based on the error voltage and the clock pulse; and
a driving control unit configured to determine on and off timings of at least one of the first and second driving control signals according to the output signal of the flip-flop.

16. The voltage converter of claim 15, wherein the flip-flop includes an RS flip-flop that has a set terminal configured to receive the clock pulse and a reset terminal configured to receive the error voltage.

17. The voltage converter of claim 14, wherein the switching control circuit comprises:
a comparator configured to compare the reference voltage and the feedback voltage to output an error voltage;
an oscillator configured to generate a triangular wave signal;
a pulse width modulation comparator configured to compare the error voltage and the triangular wave signal to output a pulse signal; and
a driving control unit configured to determine on and off timings of at least one of the first and second driving control signals according to the pulse signal.

18. The voltage converter of claim 14, wherein the switching device unit comprises:
a first switching device configured to charge the input power supply voltage in the output coil in response to the first driving control signal; and
a second switching device configured to discharge the output coil in response to the second driving control signal.

19. The voltage converter of claim 18, wherein the first and second switching devices are turned on or off complementarily to each other.

20. The voltage converter of claim 18, wherein the first switching device includes a p-channel metal-oxide semiconductor (PMOS) transistor that has a source configured to receive the input power supply voltage, a gate configured to receive the first driving control signal and a drain connected to the switching node, and the second switching device includes an n-channel metal-oxide semiconductor (NMOS) transistor that has a drain connected to the switching node, a gate configured to receive the second driving control signal and a source connected to a ground voltage.

21. The voltage converter of claim 14, further comprising:
a feedback unit that includes first and second resistors connected in series between the output node and a ground voltage, the feedback unit configured to divide the output voltage into the feedback voltage.

22. The voltage converter of claim 21, wherein the BVPC selectively provides one of the second current and the third current to the feedback node according to a characteristic of a load connected to the output node, and the first and second resistors are connected to each other at the feedback node.

* * * * *